United States Patent [19]

Desnoyers et al.

[11] Patent Number: 5,363,484
[45] Date of Patent: Nov. 8, 1994

[54] MULTIPLE COMPUTER SYSTEM WITH COMBINER/MEMORY INTERCONNECTION SYSTEM EMPLOYING SEPARATE DIRECT ACCESS LINK FOR TRANSFERRING INFORMATION PACKETS

[75] Inventors: Christine M. Desnoyers, Saugerties; Derrick L. Garmire, Kingston, both of N.Y.; Sheryl M. Genco, Boulder, Colo.; Donald G. Grice, Kingston, N.Y.; William R. Milani, Woodstock, N.Y.; Michael P. Muhlada, Saugerties, N.Y.; Donna C. Myers, Kingston, N.Y.; Peter K. Szwed, Saugerties, N.Y.; Vadim M. Tsinker, West Hurley, N.Y.; Antoinette E. Vallone, Hyde Park, N.Y.; Carl A. Bender, Highland, N.Y.

[73] Assignee: International Business Machines Corporation, Armonk, N.Y.

[21] Appl. No.: 129,880

[22] Filed: Sep. 30, 1993

Related U.S. Application Data

[63] Continuation of Ser. No. 612,649, Nov. 13, 1990, abandoned.

[51] Int. Cl.5 .............................................. G06F 13/28
[52] U.S. Cl. .................................... 395/200; 395/425; 395/275
[58] Field of Search .................. 364/DIG. 1, DIG. 2, 364/200, 900; 395/200, 425, 325, 275

[56] References Cited

U.S. PATENT DOCUMENTS

| | | | |
|---|---|---|---|
| 4,028,675 | 6/1977 | Frankenberg | 395/425 |
| 4,365,295 | 12/1982 | Katzman et al. | 395/425 |
| 4,418,382 | 11/1983 | Larson et al. | 395/200 |
| 4,570,220 | 2/1986 | Tetrick et al. | 395/325 |
| 4,583,165 | 4/1986 | Rosenfeld | 395/400 |
| 4,613,858 | 9/1986 | Davidson et al. | 340/825.5 |
| 4,760,518 | 7/1988 | Potash et al. | 395/325 |
| 4,807,184 | 2/1989 | Shelor | 395/425 |
| 4,845,722 | 7/1989 | Kent et al. | 370/58.2 |
| 4,901,305 | 2/1990 | Tangonan | 395/117 |
| 4,964,042 | 10/1990 | Sterling et al. | 395/200 |
| 4,969,120 | 11/1990 | Azevedo et al. | 395/325 |
| 5,123,089 | 6/1992 | Beilinski | 395/200 |
| 5,123,094 | 6/1992 | MacDougall | 395/375 |
| 5,133,059 | 7/1992 | Ziegler et al. | 395/425 |
| 5,166,674 | 11/1992 | Baum et al. | 340/825.07 |
| 5,179,669 | 1/1993 | Peters | 395/325 |
| 5,197,140 | 3/1993 | Balmer | 395/400 |

OTHER PUBLICATIONS

M. Morris Mano, Computer System Architecture, second edition, 1982, pp. 228–236 and 454–473.

"Composite Mini-Packet Switching", IBM Technical Disclosure Bulletin, vol. 32, No. 5A, Oct. 1989, pp. 162–164.

Kleineoder et al., "Interchange Switch for High-Speed Packets", IBM Technical Disclosure Bulletin, vol. 30, No. 9, Feb. 1988, pp. 311–312.

*Primary Examiner*—Joseph L. Dixon
*Assistant Examiner*—Matthew Kim
*Attorney, Agent, or Firm*—Floyd A. Gonzalez; Robert L. Troike

[57] ABSTRACT

A combiner/memory system interconnects a plurality of computer systems using for example the new HIPPI standard link. The combiner system includes it's own internal storage for rapid shared access to all connected computer systems. The combiner/memory system includes a smart switch for reading header information, arbitrating messsages and connecting computers to each other or to the internal shared storage. The system also includes a mechanism for synchronization of cooperating processes.

19 Claims, 22 Drawing Sheets

BIT 0 — 0 - PAGE ADDRESS AVAILABLE
1 - PAGE ADDRESS OCCUPIED
BIT 1 — 0 - THIS IS A DATA PAGE
1 - THIS IS A HEADER PAGE
BIT 2,3,4,5,6 — NEXT PAGE ADDRESS POINTER
BIT 7 — 0 - NEXT PAGE IS A DATA PAGE
1 - NEXT PAGE IS A HEADER PAGE
BIT 8 — 0 - NO ERROR, 1 - PAGE ERROR
BIT 9 — PARITY

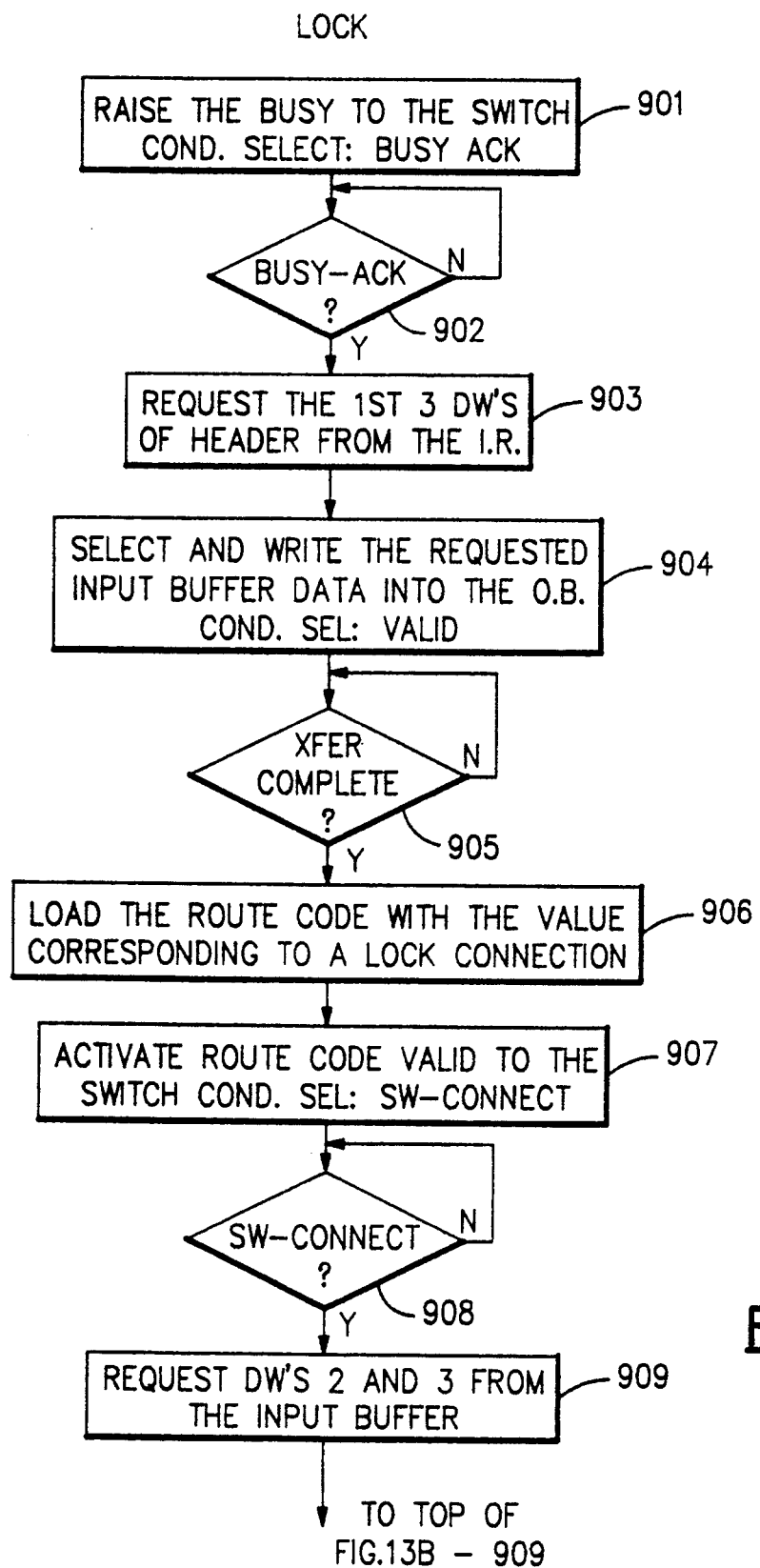

−VA1 IS THE FIRST STAGE OF VALID SENT FROM THE CARD TO THE INTERFACE
−VB1 IS THE FIRST STAGE OF VALID SENT FROM THE INTERFACE TO THE CARD
−VB2 AND −VA2 ARE THE SECOND STAGE OF VALIDS FOR BOTH DIRECTIONS
    OF DATA FLOW
−VA3 IS THE THIRD STAGE OF VALID SENT FROM THE CARD TO THE INTERFACE
−VB3 IS THE THIRD STAGE OF VALID SENT FROM THE INTERFACE TO THE CARD

A MULTIPLE COMPUTER SYSTEM WITH COMBINER/MEMORY INTERCONNECTION SYSTEM EMPLOYING SEPARATE DIRECT ACCESS LINK FOR TRANSFERRING INFORMATION PACKETS

CROSS-REFERENCE TO RELATED APPLICATION

This application is a continuation of application Ser. No. 07/612,649, filed Nov. 13, 1990, now abandoned.

1. Field of the Invention

This invention relates to systems incorporating multiple computers and more particularly to a system with a combiner/memory interconnection system with internal shared common storage for sharing information between computers and a mechanism to allow direct transfer of data between pairs of computers.

2. Background of the Invention

When a large engineering-scientific problem is solved on cooperating computers they must share data at some point in the execution. Communication channels between computers allow them to transfer data between the computers to effect the sharing. When shared memory operation is started a common synchronization mechanism (locks) must be provided to guarantee the correct operation of the cooperating computers.

An American National Standards Institute (ANSI) X3T9-3 link for information handling referred to as High Performance Parallel Interface (HIPPI) has been proposed for peak data rates of 800 or 1600 megabytes per second between data processing equipment using multi-twisted pair copper cabling at a distance at up to 25 meters. This invention relates to direct memory access links like the HIPPI standard with packets and burst within the packets with peak data rates of 800 or 1,600 megabytes per second. Future standards will be used for higher speed serial optical data links. This combiner/memory system can be used for this link as well. U.S. Pat. No. 5,218,677 (Bono et al.), filed on May 30, 1989 assigned to same assignee as the present application describes an apparatus and method of implementing a high speed link (HSL) such as this newly proposed standard on processor complexes like the IBM 3090 having paging store with independent bus. This patent application is incorporated herein by reference. This application describes how processor complexes can be coupled together via the external storage paging store port of the processor complexes. This present patent application relates to a combiner/memory interconnection system and computers having a direct memory access link adapter and cabling such as the HIPPI standard for interconnecting computer complexes such as 3090's with each other or with other supercomputers or computer complexes and also interconnecting such separate computers to common internal shared storage.

A simple HIPPI standard cross-point switch system is presently on the market by Network Systems. Each input port is a HIPPI compatible source, each output port is a HIPPI compatible destination. Connections are directly controlled by the HIPPI I field. This field is sent by the source with the request. The switch uses part of the I-field to obtain the requested output port number. If the requested output port is busy or not installed in the card cage then the request is rejected otherwise a connection is made and the I-field is passed on to the HIPPI destination or other switch. This HIPPI switch simply provides a connection based on the I-field and remains connected until finished and there is a disconnect. The switch is from a HIPPI port to another HIPPI port where the switch itself has no intelligence. The switch may connect up Cray supercomputers and an IBM mainframe or the Cray supercomputer mainframe will be separately connected to auxiliary storage high speed disk via one of the HIPPI ports. When these supercomputers attempt to use the high speed disk auxiliary storage it takes a considerable length of time to retrieve the data from such storage whether the amount requested is small or large. In the protocol of a HIPPI type connection the data is generally sent in packets.

As mentioned in Bono et al. application Ser. No. 358,774 filed May 30, 1989 clusters for example four 3090s can be coupled to each other via the paging store bus and the high speed link using high speed link adapters which may be like the HIPPI adapter. Since these operations operate in page mode the operation is very fast and very close to the speeds of main memory accesses in moving blocks with an instruction. It is desirable to find some way of connecting 3090's to each other or to other computers and yet also to extended storage where the computers share a common storage.

SUMMARY OF THE INVENTION

A plurality of computer systems are interconnected by a direct memory access link like the High Performance Parallel Interface (HIPPI) standard by a combiner/memory system. Each computer system has a link adapter and sends packets of data with bursts within each packet and a header page for each packet indicating a command to link with another computer or a shared internal memory of the combiner/memory system. The combiner/memory system includes this shared internal memory and a multiple switch system having a link adapter at each port for receiving and sending said packets. The switch system includes a decoder for decoding the header page of a packet for coupling the data in the packet to another computer or to said shared internal memory depending on the command in the header.

BRIEF DESCRIPTION OF THE DRAWING

A more detailed description of one embodiment of the present invention is provided in combination with the following drawings wherein:

FIGS. 13A and 13B are flow charts of the lock command.

DESCRIPTION OF THE PREFERRED EMBODIMENT OF THE PRESENT INVENTION

Figure 1:
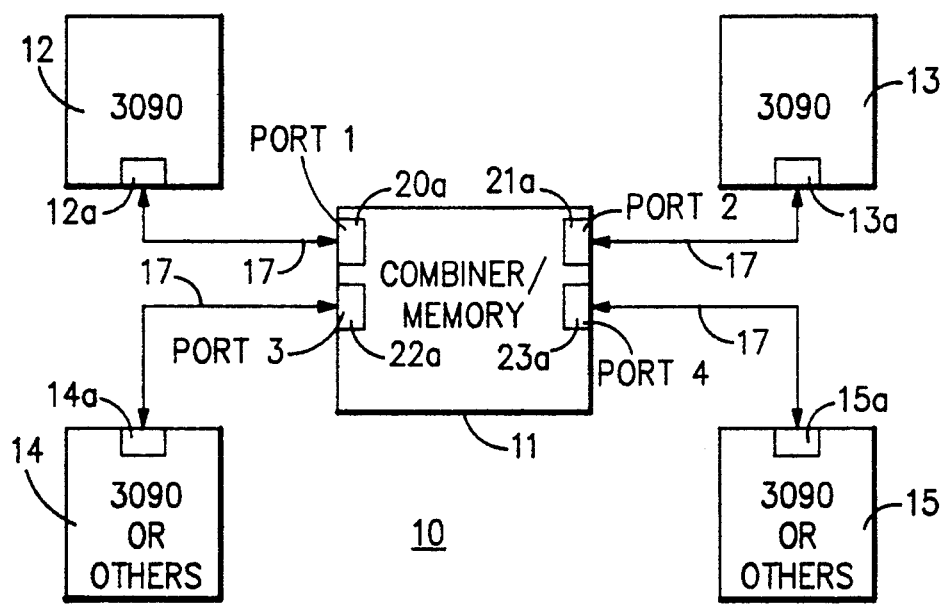
FIG. 1 is an overall block type diagram in which processor system complexes of different types are coupled to the shared extended storage combiner/memory system to form a global supercomputer system.

Referring to FIG. 1 there is illustrated a block diagram of the multiple computer system 10 which includes a shared combiner/memory system 11 interconnecting a plurality of computer systems 12, 13, 14, 15 such as IBM 3090 multiprocessor systems 12 and 13, for example, at ports 1 and 2 and IBM 3090 or other computers such as a Cray XMP computer 14 and 15 at ports 3 and 4.

The other computers could also be IBM RISC 6000 computers. The architecture of the information and command transfer mechanism is such that the information flows independent of the computer design as long as it meets the communication protocol. Each of the computers has a direct memory access link adapter 12a-15a such as the HIPPI standard link adapter with data sent in separate transmit and receive packets with burst of, for example, 256 cycles of one double word bursts. Also for the example appropriate HIPPI controls are separately sent. The cabling 17 between the computers 12-15 and the combiner/memory system 11 is the high speed direct memory access link cabling such as the HIPPI standard cabling. In the preferred embodiment for each 40 nanosecond clock the data sent is 72 bits wide. A page boundary is, for example, two 256 double word bursts. The first page of data for every packet contains a header page. It is also possible to use a port of the system 11 to attach other multiple computer systems to expand the number of attached processors and memories. This shared combiner/memory system 11 call be used to enhance parallel FORTRAN performance by allowing up to four 3090's or a plurality of 3090's or one or more other processors such as Cray XMP Supercomputers to operate on a single data operation. The ratio of the processor to memory units depends on the application and should match the expected utilization of the memory bandwidth by the attached computers.

Figure 2:
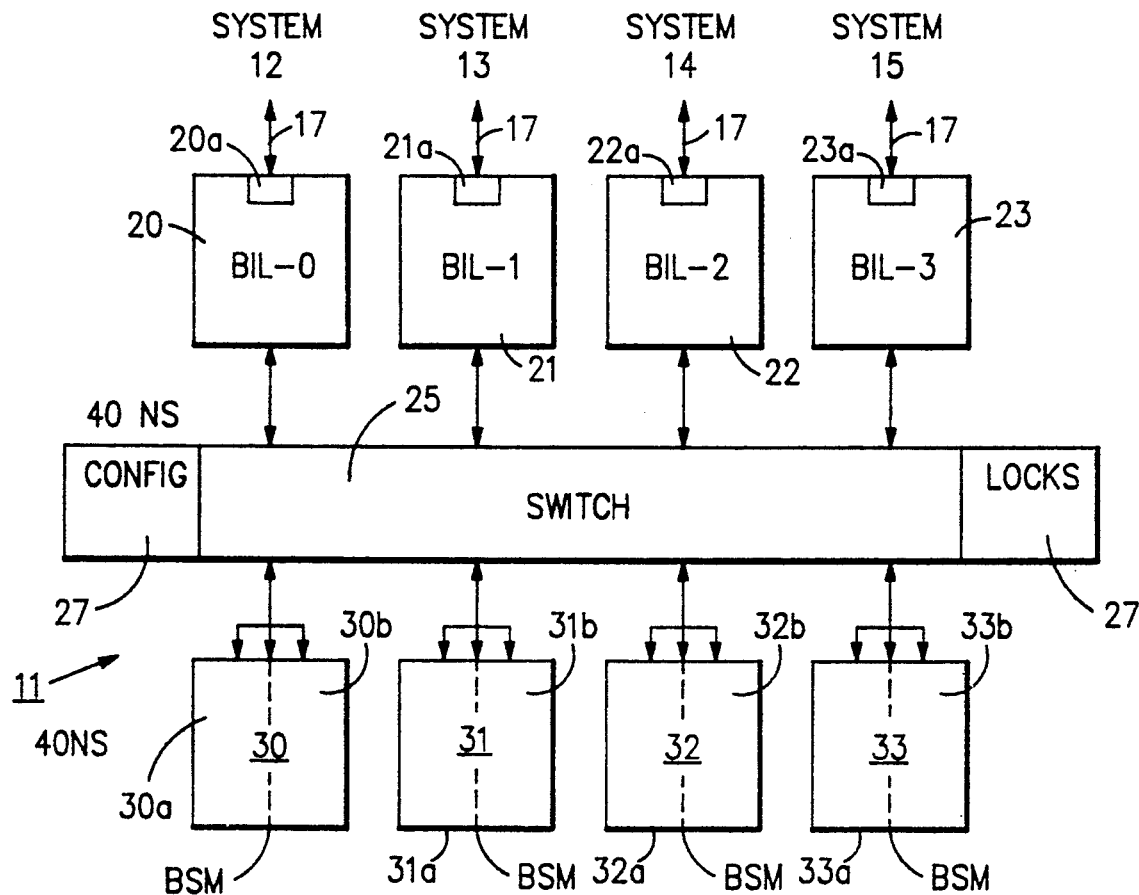
FIG. 2 is a block diagram of the combiner/memory system according to the preferred embodiment of the present invention.

The combiner/memory system 11 as shown in FIG. 2 is composed of four buffer interface logic sub-units (BIL) 20 thru 23, switch 25, lock/configuration mechanism 27 and four shared basic storage modules (BSM's) 30 thru 33 for shared memory. The BILs 20 thru 23 interface to the communication channels of the attached computer systems 12-15 respectively via cables 17 and the internal switch 25. The switch 25 arbitrates requests for message passing and memory access. It provides the paths for the computers to communicate with each other, the shared memory BSMs 30 thru 33 or the lock-/configuration mechanism 27. The lock mechanism 27 provides synchronization of the cooperating processes. The connections between the 3090s or the Cray computer systems and the system 11 are via the high speed protocol such as, for example, the HIPPI protocol.

Figure 3:
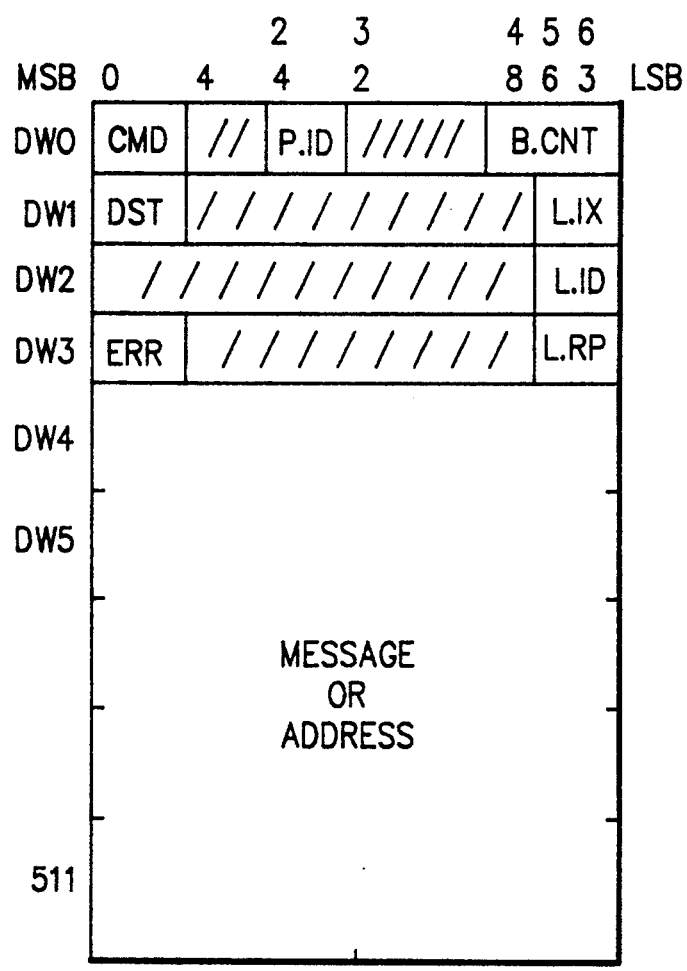
FIG. 3 illustrates the header page format.
Figure 4:
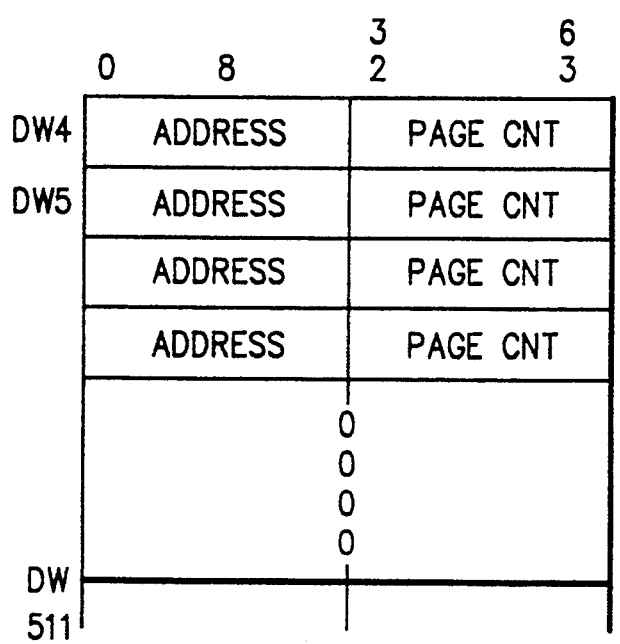
FIG. 4 illustrates the address field format.

The HIPPI bus has the following control lines of: clock, interconnect (source to destination), interconnect (destination to source), request, connect, packet and burst for both transmit and receive. The computer system (12 thru 15) via its adapter (12a thru 15a) sends a clock and an interconnect and the destination responds with an interconnect. The source computer system (12-15) sends an I-Field "request" and the BIL destination sends a "connect". The messages passing down to the system 11 from the computers 12 thru 15 via their adapters 20a thru 23a will consist of packets of multiple 4K byte pages. The first data page is a header page and it describes the operation or "command" to be performed and it further indicates the destination port. FIG. 3 illustrates the header page format. The header page is followed by N data pages. A first field and the first double word (DW0) on the header page contains the "command" signal (labeled CND). In the case of a "signal" type command this calls for one computer system (for example system 12) to send data to another (for example system 13) computer. The header fields for the "signal" command also includes the block count (BCNT) which is the total number of pages in the packet, destination (DST) (destination port of the packet) and the message beginning at the fifth double word (DW4). A "write" or "store" command on the header allows a computer to store data into the shared memory BSMs 30-33. It also allows blocks of data to be distributed over multiple areas by specifying the starting address and length of each storage. The block count field indicates the total number of address page count set in the message address field. For operations involving reading or writing of data to the BSMs the message or address field in FIG. 3 starting with the fifth double word (DW4) the field consists as shown in FIG. 4 of a list of page addresses and page counts. The sum of the lengths must be equal to the total amount of the data being stored. A "read" command allows a processor to retrieve data from the shared memory. It has the same architecture as the "store" in that multiple blocks of data can be retrieved as a single block. The "clear data" command allows a computer to clear data in the shared memory. It is identical to the "write" command but no data need be sent. This allows blocks of data to be distributed over multiple memory areas by specifying the starting address and length of each storage area. A "lock" command performs the equivalent of a "test" and "set" command with 256 1-byte lock functions. If the location is available it is locked with the new lock identification (ID) number. If it is not available the requester is notified that the lock failed and the system must try again. The header fields consist of the command field, the location in the lock table (L.IX) and the ID (L.ID) to be inserted into the location pointed to by the index. A "lock and read" command is a combination of lock and read commands. The read is performed only if the lock command was successful. This consists of only the header page. The header fields consist of command, lock index, lock ID, block count, and page address-page count pairs. It is provided to reduce the overhead and latency of the lock and read sequence. The "store and update command" is a combination of store and update commands and update will lock only if the write command completes successfully. It is provided to reduce the overhead and latency of the store and update sequence. The header page fields includes the command, lock index, lock ID, block count and page address-page count pairs. The header is followed by the data pages. The command "update lock" allows a port to change the value of a lock location in the lock table without being checked. This is normally used to unlock a location but it can be used by supervisor code to reallocate locks during error conditions. A "read lock table" command allows a port to read the entire lock table. This is normally used by supervisor code to diagnose error conditions. A "read configuration table" command allows a port to read a configuration table which contains the information about the number of the attached ports, the amount of memory in the system and the location of the bad memory page tables.

Figure 5:
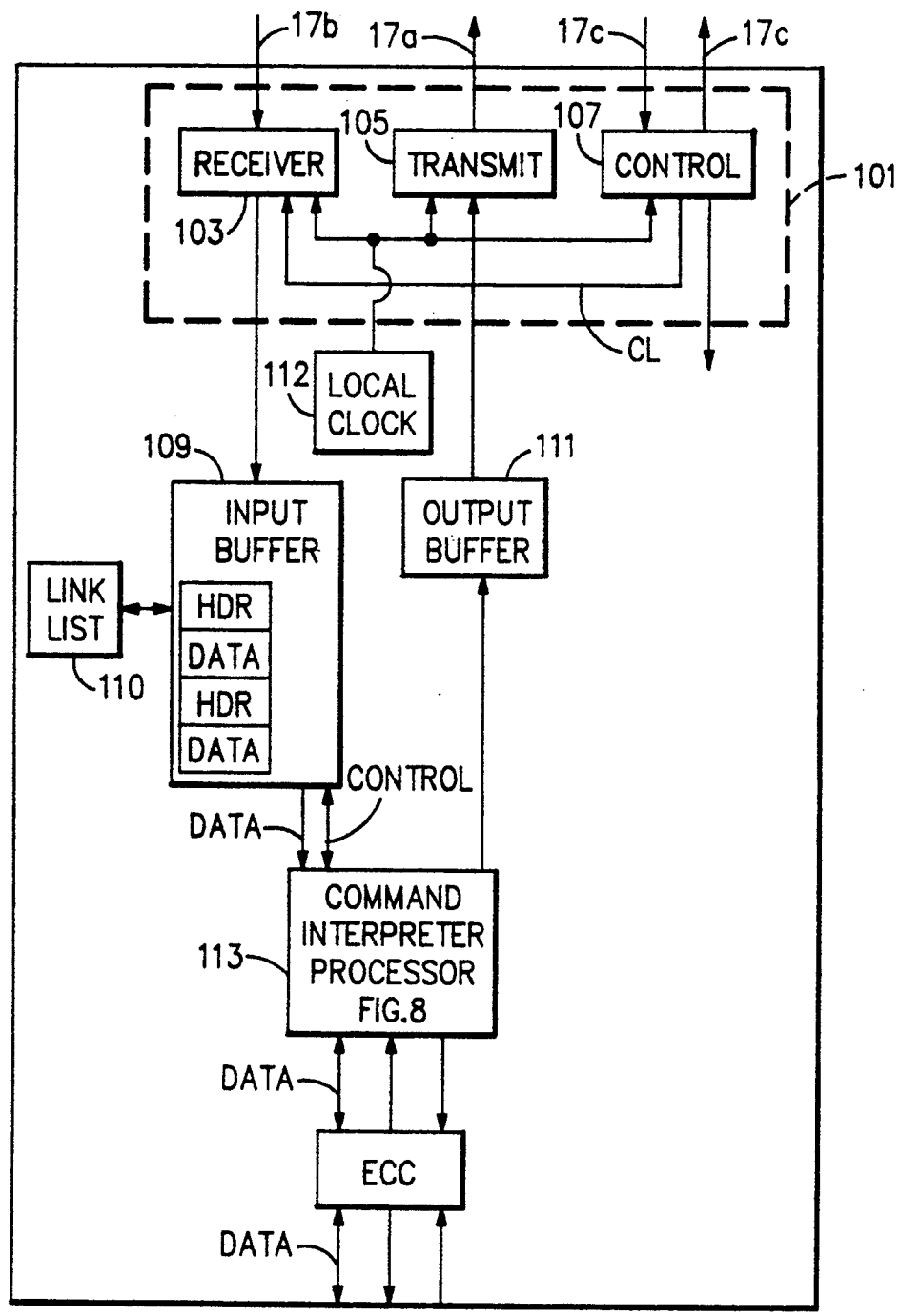
FIG. 5 is a diagram of the buffer interface logic unit (BIL) in FIG. 2.

Referring to FIG. 5 there is illustrated a functional block diagram of a buffer interface logic (BIL). The HIPPI data signal in the preferred embodiment is 72 bits wide and operates on a 40 nanosecond clock cycle. There are 64 bits of data and there are 8 parity bits. Separate from the data bits there is the separate previously discussed separate receive and transmit control signals. The control signals include the 40 nanosecond clock signal, the interconnect signal which interconnects going from one direction from the source to the destination and another separate control signal going from the destination back to the source. There follows the "request" (source to destination) control that goes from the source to the destination, the "connect" from the destination to back to the source, the packet "signal" and the "burst" signal. The order was discussed above. The separate set of these control signals for receive and transmit is applied over leads 17c of cable 17. There is separate 72 bit wide data receive lines 17a and 72 bit wide data transmit lines 17b. In accordance with the system of this invention once one of the computers such as the IBM 3090 computer is connected to a port (1 thru 4) and there is a "request" and a "connect" has been returned and received the system remains in the connect state awaiting the packet control signal. When a computer is not connected a fensed control signal is provided. When a packet control signal is sent the packet data is started by the header page and can have any number of 4 kbyte data pages after a header page. Each packet may include a plurality of burst control signals. A page boundary is two full 256 word (256 double word) bursts (512X8=4 KB(kilobytes). In other words each page consists of two 2 KB bursts where each burst has 256 double words (64 bits+8 parity bits). In accordance with a preferred embodiment of the present invention there is a maximum of 256 cycles of data per burst. Each 40 nanosecond clock cycle sends the 72 bit wide data. After the 256 cycles the last word of the burst contains a redundancy code made up of one of the 72 bits for each word (LLRC). These HIPPI or HIPPI-like data and control signals are sent by the computers 12-15 coupled to the respective BILs 20-23 which are identical. Each buffer interface logic (BIL) (20-23) includes a HIPPI adapter 20a thru 23a as shown in FIG. 2. The HIPPI adapter 101 in FIG. 5 illustrates one of the adapters 20a thru 23a for one of the BILs 100 and, includes a receiver register 103, a transmitter 105, and a control unit 107. The receiving register 103 receives the HIPPI data from a computer via the receive data bus 17b associated with the port of this interface logic. The transmit register 105 receives the data from the switch 25 via output buffer 111. This data is transmitted to the destination computer connected to the BIL via transmit data bus 17a. The control unit 107 separately transmits and receives the transmit and receive HIPPI control signals of clock, two interconnect, request, connect, packet and burst. The receiver register 103 has to synchronize between the local clock 112 of the combiner/memory system 11 and the input clock of the computer connected to the BIL. The clock control signal received at the control 107 in the adapter is the clock signal from one of the HIPPI connected computers 12 thru 15. The input data from the HIPPI attached computer to the BIL 100 is timed into the receive register 103 by the received computer clock to control 107 and is timed out of the receive register 103 on the basis of the local clock 112 of the combiner/system 11. The receiver register 103 includes data capture latches, synchronizing logic and a LLRC checker. The output from the register 103 is clocked by the local system clock 112. The transmit register 105 receives data from the output buffer 111, checks parity, generates and inserts LLRC for the data and transmits the data through the transmit HIPPI interface 105 to the attached computer. The receive data at receive register 103 is applied to the input buffer 109. The receiver register 103 provides input buffer 109 staging, and parity checking. The input buffer 109 staging is to delay data from the input to allow time to process the address and control of the input buffer.

The input buffer 109 is a 128 kbyte array that holds 32 512×72 bit (4 kbyte) pages. It is partitioned into two interleaves each 8k×72 bits to allow writing of data off the receive register 103 while read or write on the executed operation.

When the attached computer (12 thru 15) sends a packet to the BIL 100 and the input buffer 109 has room, the buffer 109 receives the data from the receive buffer register 103 of the adapter storing the header page and the data (message or address) pages. FIG. 3 and the previous discussion therewith describes the format of these pages. The data in input buffer 109 was sent in bursts (half page) and stored in pages and the address in the input buffer is stored in the link table 110. A return message sent through the output buffer 111 and transmit register 105 notifies the computer attached the success of the operation and contains any requested return data. The computer and the adapter 101 will permit transfer in which case the process will wait until room is made available to transmit the succeeding pages of data until the end of the packet or the buffer 109 is full. When the first burst of the header is received the command interpreter (CI) 113 coupled to the input buffer will determine which of the ten "commands" taken from the header will be performed. The link list table 110 consists of 32 9-bit entries each representing one page of input buffer space (32×4K=128 KB).

For each page entry, the address of the input buffer is stored in the link list 110 together with the header or data page, the last data page in the packet, and the address of the next entry for the same packet. The input buffer can therefore handle multiple packets and bursts and the pointer provided by the link lists allows for each data entry in the input buffer to know when the last data page of the packet occurs and the address of the next entry for the same packet is directed. Therefore regardless of how many packets there are in the input buffer and where the packets are located by the page the link lists will direct where the next entry for the same packet is located in the input buffer and the system is able to sequence the data out of the input buffer for the same packet.

Figure 6:
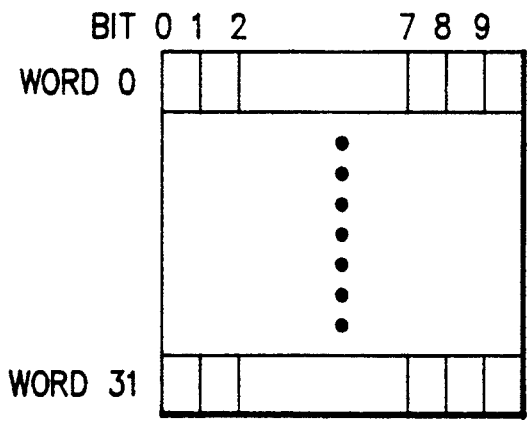
FIG. 6 illustrates the linked list table format.

Shown in FIG. 6 is the linked list structure as implemented in a BIL card. The linked list table as implemented in BIL keeps track of location of all the pages in a ⅛ Mbyte, or 32 page (4 Kbytes per page), buffer. The bit fields contain various information about the page being stored in the buffer. This information pertains to availability of the page in the buffer; the type of the present page being stored, in this case Header or Data; the pointer to the location of the next page to be stored, which is expressed in a 5-bit field; the type of the next page to be stored (Header or Data); an error bit that's set in an event of an error during transmission of this page over HIPPI interface; and a parity bit on a 9-bit linked list word.

The control logic consists of 2 write and 3 read register-pointers as well as 3 state machines. The functions of the linked list controller is to provide the most significant bits (page address bits) during read and write operations to and from the Input Buffer. The two write pointers keep track of the address of the current page being written into the buffer as well as the next available address. The three read pointers keep track of the current header page address, data page address and the address of the next page to be read from the buffer.

Figure 7:
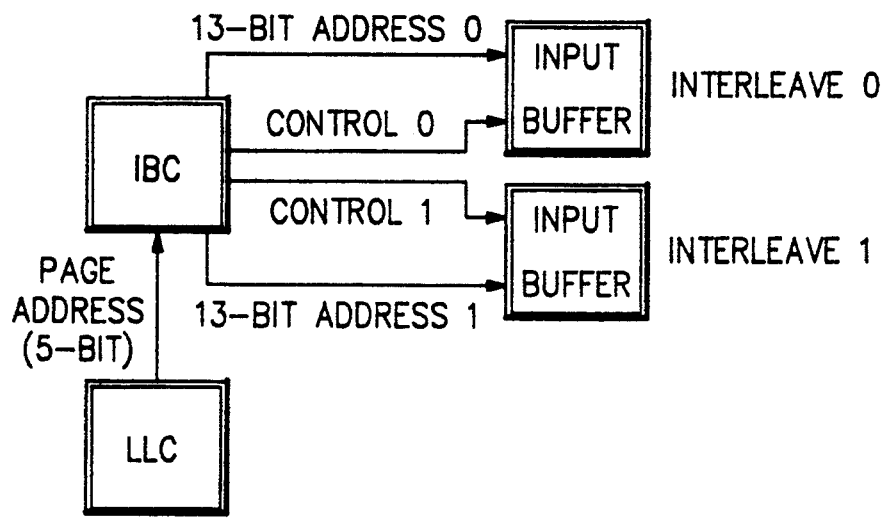
FIG. 7 illustrates the input buffer control.

In the current implementation of BIL's Input Buffer the link list controller controls only the page boundary addresses. Since the input buffer supports simultaneous read and write operations the actual read/write requests from the buffer as well as read/write arbitration are performed in the input buffer controller shown in FIG. 7.

Current link list controller design supports simultaneous read/write requests and can generate the next available write address in under 500 cycles and the next read address in at most 11 cycles. With some design modification these figures can be improved to almost 4 cycles for the write and 8 cycles for the read.

Figure 8:
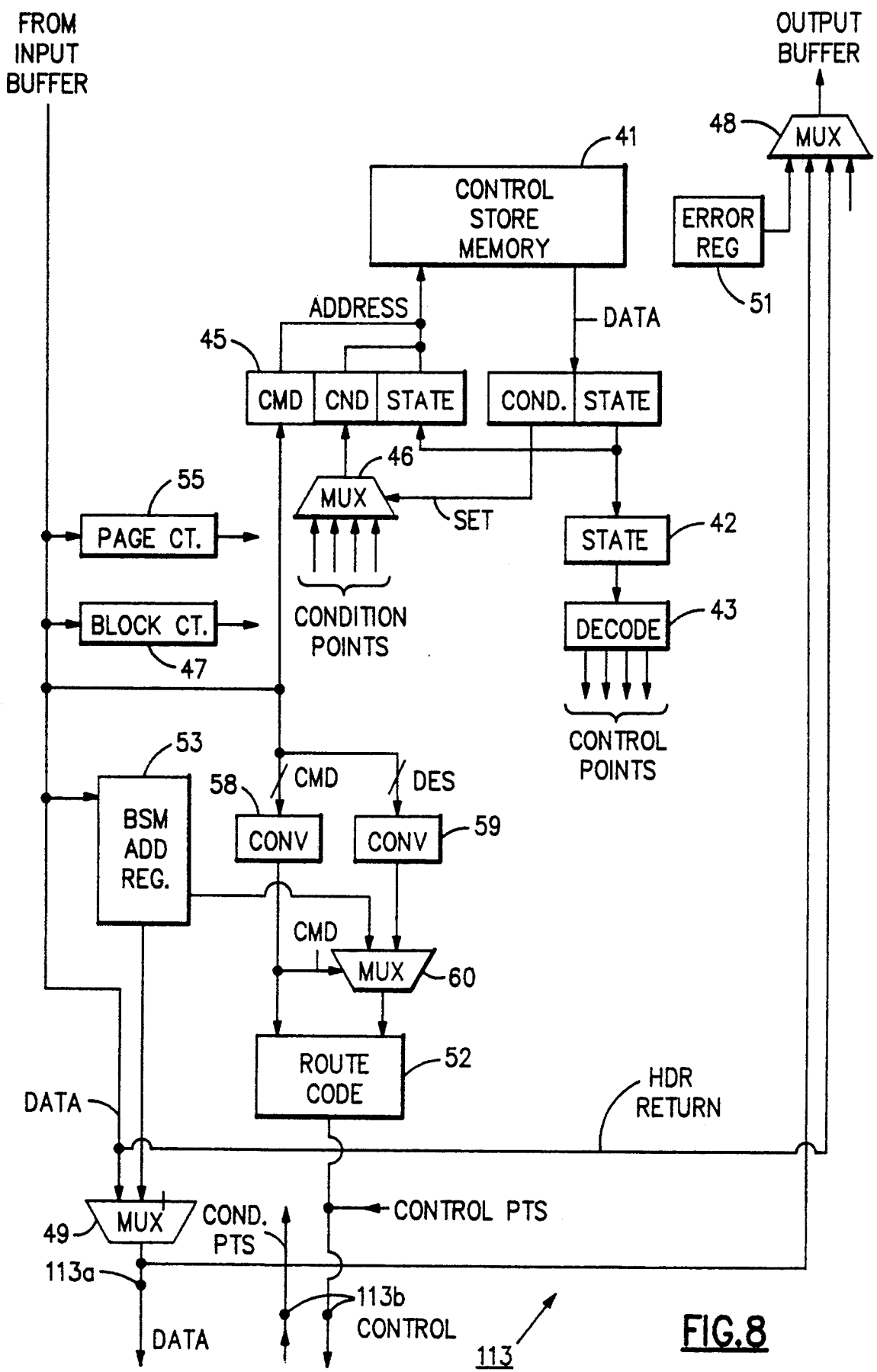
FIG. 8 is a diagram of the Command Interpreter of FIG. 5.

Return data from that BIL 100 to the destination of the connected computer is provided by the return header which is provided from the header information in the input buffer. The return header is coupled to the output buffer 111 with the data to the output buffer 111. The header control is sent to the command interpreter logic 113. The structure of the state machine of logic 113 as shown in FIG. 8 consists of a memory 41 to the store the states to the machine and discrete logic 42 and 43 to decode control points from the current data word address and next data word. In order to minimize the needed memory width, the part of the current data word which is used for the mixed addresses is also decoded into control points. The basic structure of the command and interpreter is shown in FIG. 8. The address to the memory consists of three parts. The first part corresponds to a special case of the current system conditions. It is the "command" from the communication link (on header) with the attached processor that is currently being acted upon. This condition will remain static during the entire execution of a single command. The second portion also corresponds to system conditions but to the many that may be dynamic through the execution of a command. To reduce the needed address width, the condition used to actually address the memory is selected through a multiplexer 46 which is controlled by part of the current data word (set from condition). The third part of the address is part of the data word is also decoded into the system control points. The data word is broken into two main section. The first is used to control the system conditions used in the next address and memory as described above. The second portion (state) is used to address the memory as described above and is decoded into the system control points. Because this portion of the data word has a dual role, it is broken further into two section. The STATE section goes through the decoders 43 for the system control points. The SEQUENCE section does not. The purpose of the SEQUENCE is to allow two data words that decode into the same set of the control points to look like different memory addresses.

When the command interpreter (CI) 113 is first started the first instruction to the control store decodes the first word (DW0) request in the header from the input buffer 109. When the header page has been received by the input buffer 109 it will respond to the Command Interpreter's 113 request by sending the the first double word of the header page. As specified by the architecture of the system, the first double word of the header page contains the command and a block count. Meanwhile, the microcode in the memory 41 has been waiting for this double word loaded in the address register 45 is used to specify the portion of the address into the control store for the instruction corresponding to that that particular command. The block count portion of the double word is stored in the register 47. Thus, each command specifies a portion of a control store in which the instruction sequence effecting that command interpretation is stored. The condition points selectively provided to the multiplexer 46 are "busy acknowledge", "switch connect", "block count 0", "Page Count 0", and "valid" signal from input buffer 109. The control points from the memory decoded out of decoders 43 are: "Busy"-(goes to switch), "Route code valid"-(goes to switch), "Load Block Count"-(goes to block counter), "Load Command", "Load Route Code Register", "Read Input Buffer Header", "Read Input Buffer Data", "Decrement Block Counter", "Disconnect"-(goes to switch) (BIL Disconnect), "Select Input Buffer"-(goes to multiplex for output buffer (O.B.), "Select Switch"-(goes to multiplexer for O.B.), "Select Error Code"-(goes to multiplex for O.B.), "Select Input Buffer to Switch"-(goes to multiplexer 49), "Select BSM Address FR Switch"-(goes to multiplexer 49), "Load BSM Address", "Load Page Count", "Decrement Page Count", "Reset Control Store Register", "Page In"-(goes to HIPPI Transmit Adapter), "Packet end"-(to HIPPI transmit adapter), and "NO-Op".

The CI 113 includes an output buffer 111 multiplexer 48 that couples the header to the output buffer 111 with the "Select Input Buffer" control signal from decoder 43. The data from the switch i s selected to the output buffer 111 with the select switch control signal from decoder 43. An error code from register 51 selected at multiplexer 48.

The CI 113 further includes a switch multiplexer 49 that couples data from the input buffer 109 to the switch via bi-directional bus port 113a. A BSM address register 53 stores the starting address taken from the header at the input buffer for a Store/Fetch command. The whole address is sent to the switch through the multiplexer 49 under the "Load BSM Address" command from decoder The CI 113 includes a page counter 55 coupled to the input buffer for counting the pages and responsive to the control signals "Load Page Count" and "Decrement Page Count" from decoders 43.

A route code for controlling the switch 25 is constructed at the route code register 52. The "command" signal from the "input" buffer is also sent to converter 58 which converts the command to two bits of the code identifying the command. For the signal command (BIL to BIL) the code is, for example, "00". For a Fetch or Store Command is "01" and for a lock command is "10". The remaining two bits of the code identified which BIL, BSM, or Lock. For a BIL identification the header information at the input buffer has the destination information and this is converted to the appropriate code for the destination BIL at converter 59 via multiplexer 60. For a BSM a part of the BSM address at BSM register 53 is provided to identify the starting BSM and these BSMs are incremented at each page boundary to provide interleaving among the BSMs. That is, after the starting BSM such as BSM30 has loaded or sent a page, the next BSM (BSM31) is loaded or sends a page, after that page is loaded or sent the next BSM (BSM32) is loaded or sends a page, and after that page is loaded or sent the next BSM (BSM33) is loaded or sends a page, etc. The resulting route code from register 57 and the switch control signals such as "busy", "Route Code Valid" and "disconnect" are sent to the switch 25 via the control signal port 113b.

Now, an overview of those sequences will be presented, the commands as specified in the system architecture can be split into three groups: signal, memory transfer, and lock access.

Figure 9:
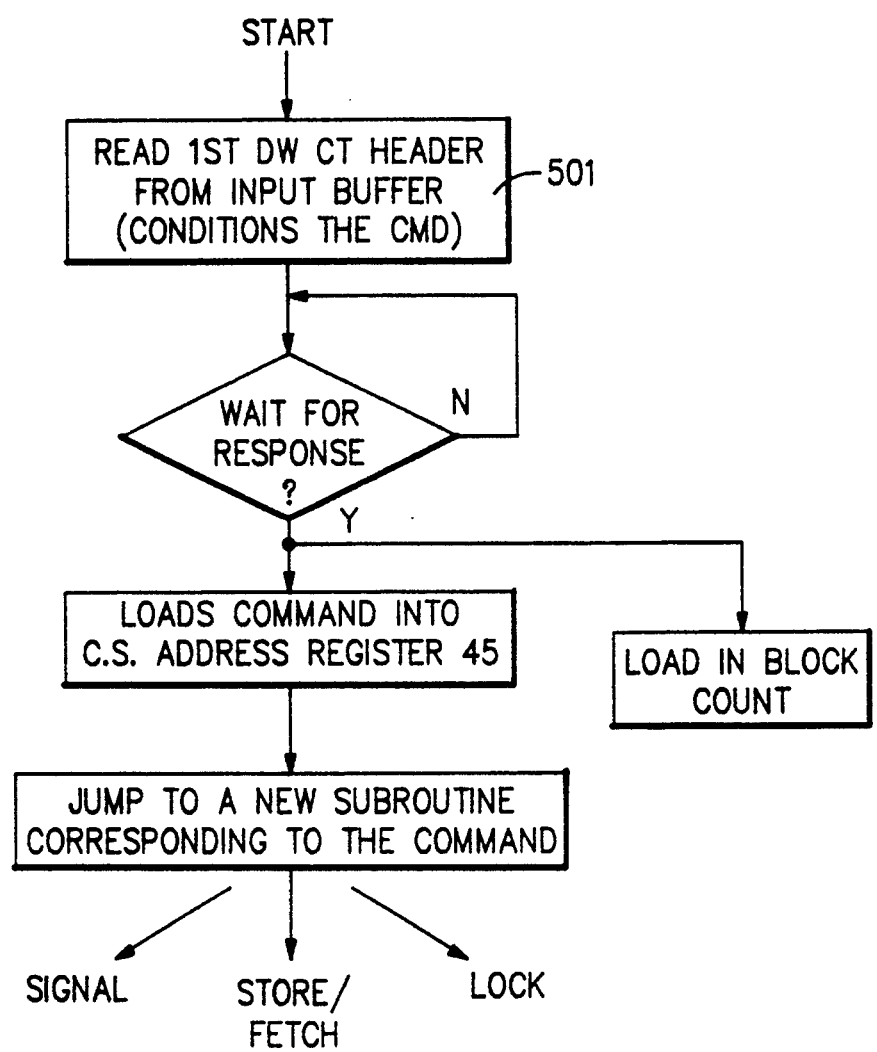
FIG. 9 is a flow chart of the command subroutine.
Figure 10A:
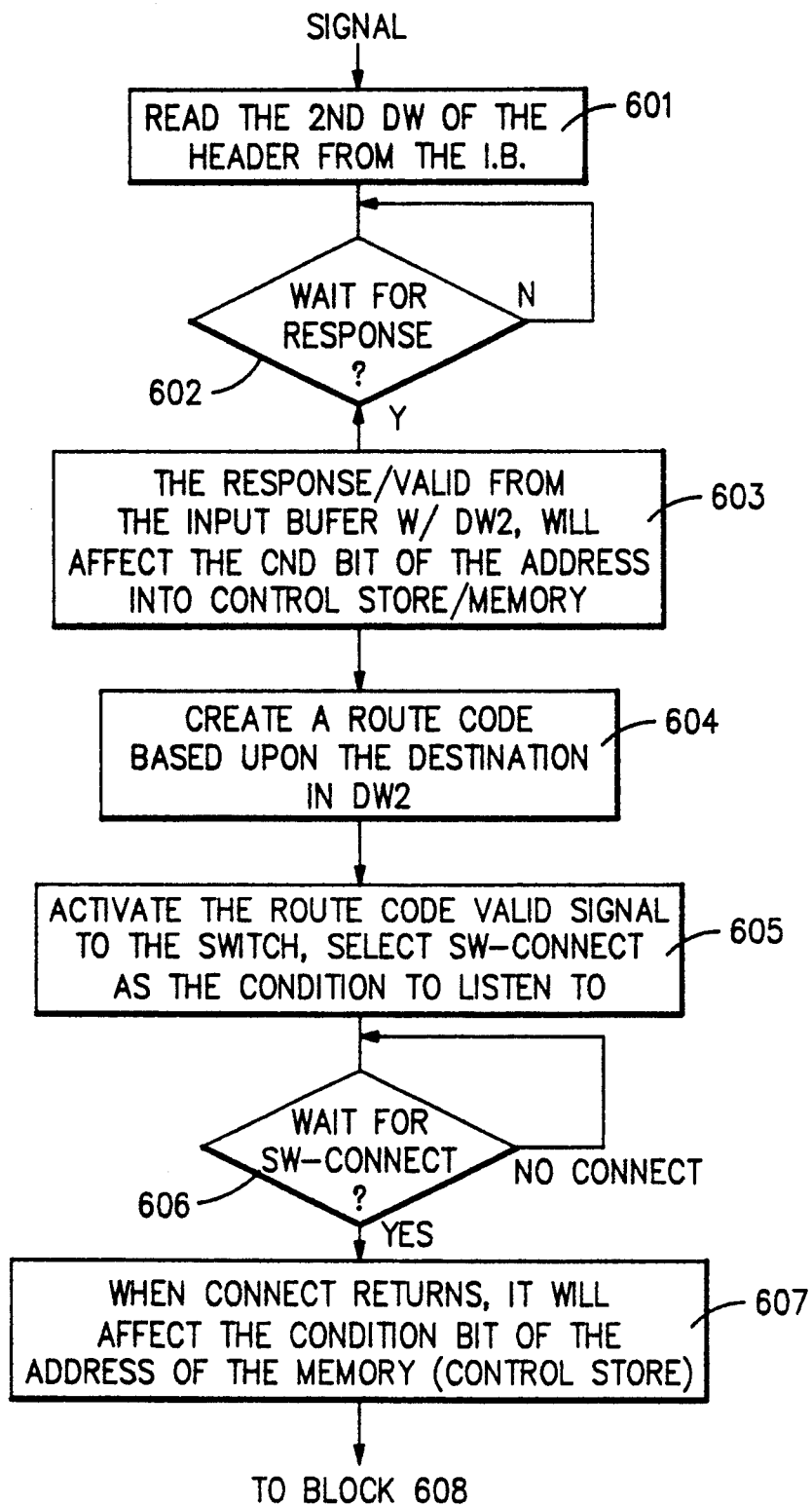
FIGS. 10A thru 10D are flow charts of the signal command.
Figure 10B:
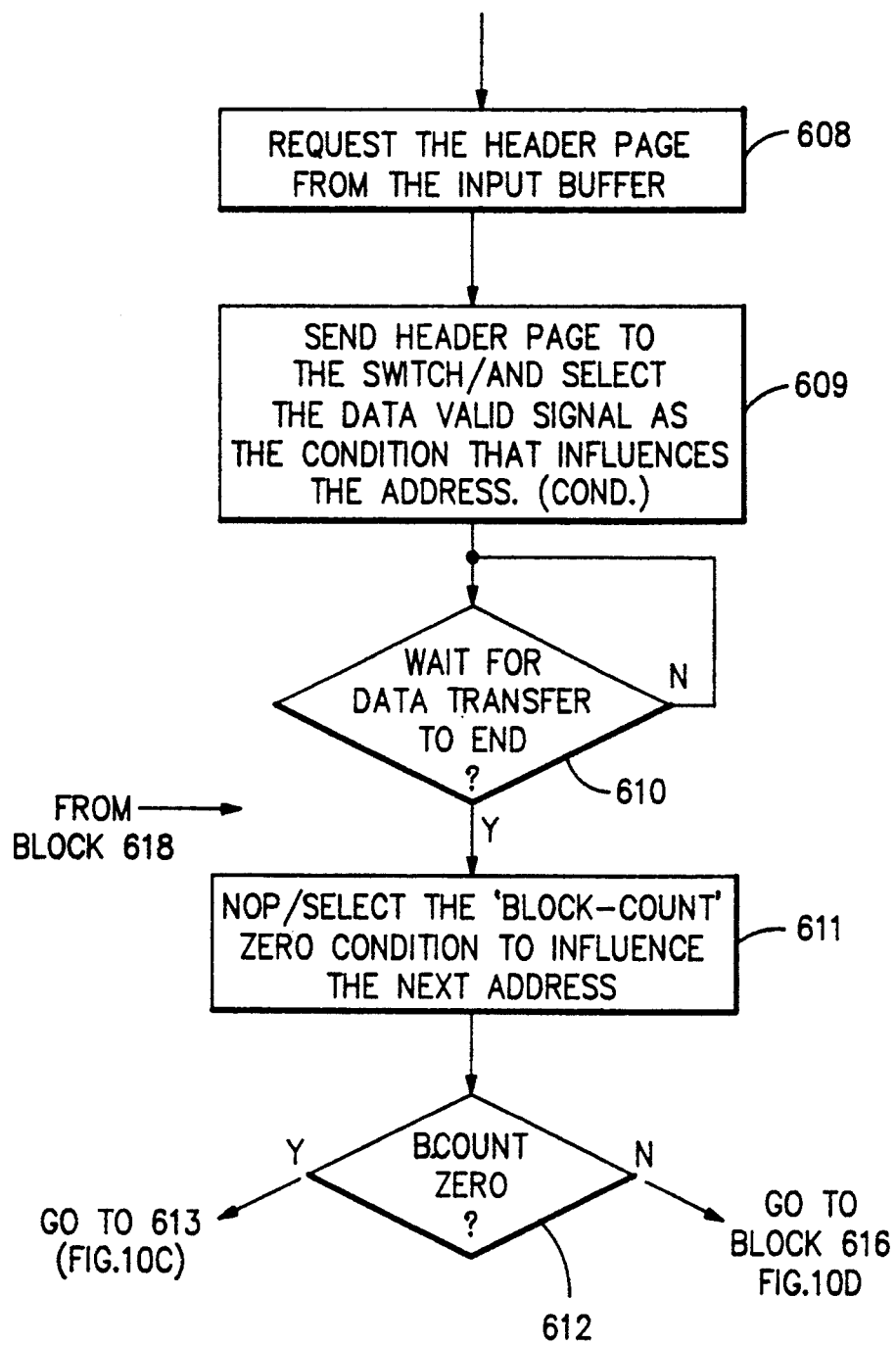
Figure 10C:
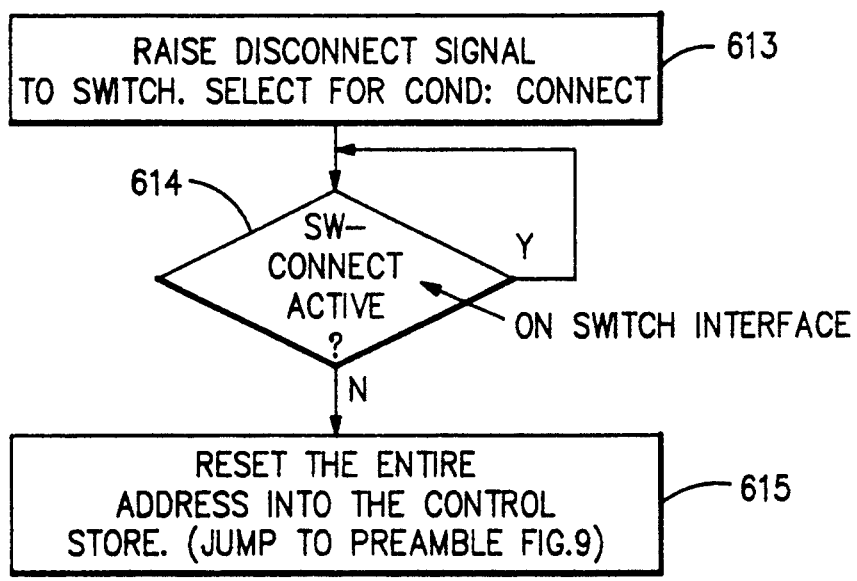
Figure 10D:
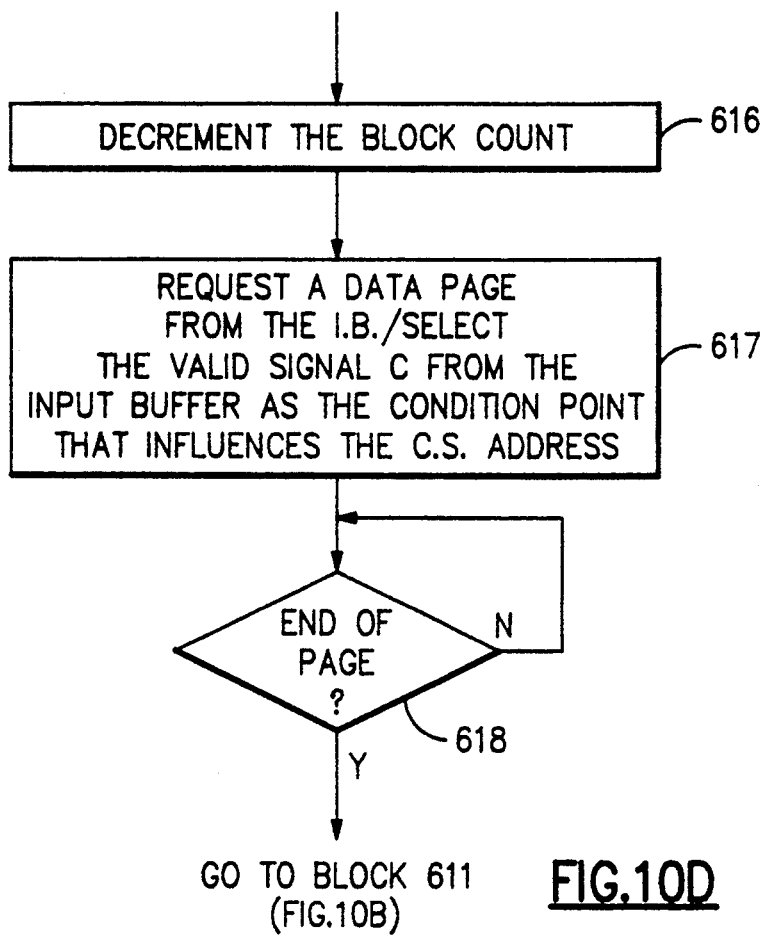

FIG. 9 is a flow chart for the preample subroutine in the control store. As noted in FIG. 4 detailing the structure of the CI, each instruction has 2 parts:
the condition code, which selects which condition point will influence the control store (CS) address.
the state code, which is decoded into system control points.

In the flow charts, each box corresponds to an instruction in the control store. In most cases, an instruction will not specify a condition code, in which case, execution proceeds to the logical next instruction. In cases where a condition is to determine the next instruction, a condition code is given. In the flow chart, when an instruction includes a condition code, the condition selected will be listed. Then a decision block shows where code execution progresses to based upon the value of the selected condition point. The first step is to read the first double word at header from the input buffer to get the command. The load input buffer header controls the load command and the load block count is sent. The command signal is loaded into "CMD" field of address register 45 and the block count is loaded in block counter 47. The system jumps to a new subroutine that corresponds to the command.

In a "signal" command, the transmitting computer sends a block of data to a receiving computer (from BIL to BIL). The CI logic 113 effects this transfer by first establishing a switch connection with a destination computer (via a BIL) as specified by the destination mask in the second DW of the header page. It then sends through the switch the header page followed by a number of data pages specified by the block count. On the other side of the switch connection, there is another CI that will be interrupted, receive the data from the switch and pass it into the output buffer. Note that a CI will not be interrupted while in the middle of a command execution. It can only be interrupted in between commands. Finally, the CI drops the connection and requests the first DW of the next header page (the next command) form the input buffer. FIG. 8 and the flow chart of FIGS. 10A thru 10D give a more detailed explanation of this sequence of events.

When a "signal" command is decoded the "signal" command subroutine reads the second double word from the header. The response/valid from the input buffer within the second double word changes the "CMD" field of the address into the control store memory 41. The route code at register 52 is formed by the command bits converted at converter 58 to "00" for a BIL to BIL or "signal" command and the converted destination bits converted at converter 59 identify the destination BIL to be coupled. The second lower two bits are coupled via multiplexer 60 to the route code register 52. The control store sends a route code valid out of decoders 43 when the route code has been created. This system waits for the switch connect as the condition point into the multiplexer 46 which provides that condition into the conditions field (CND) of the address registers 45. When the switch connect is reviewed, the connect bit becomes part of the address to the register 45. When the switch connect is reviewed, the connect bit becomes part of the address to the control store, along with the "CMD" and "State". This is at decision block 607. The header page at the input buffer is requested (Block 608) and sent to the multiplexer 49 and to output port 113 to switch 25. The data valid signal from the input buffer is sent via the multiplexer to the condition (CND) field of the address to the control store. After the data has been sent (both the header page and the data pages) the system looks for the block count loaded in register 47 to be zero (decision block 612). If zero (yes) the disconnect is provided by register 47. This condition is applied via the multiplexer 46 to the address "CND" field causing the "Block Count" Zero condition to influence the address to the control store. The disconnect signal out the decoders 43 from the control store sequences at state 42 is provided to the switch 25 via port 113b. Also a switch connect condition is provided to the "CND" address via multiplexer 46. When the switch connect is no longer active (decision block 614) the "signal" command ends and the system returns to the preamble subroutine at block 501). If the count is not zero (at decision block 612) the block counter 47 is decremented (block 616) and a page is requested from the input buffer. The valid signal from the input buffer is applied as the condition point to the "CND" address field of the control store address. If the page ends as determined by its page count (decision block 618) the zero block count is again tested and the cycle beginning at clock 616 continues until the block count is zero. Data from another BIL (processor) that passed through port 113 to multiplexer 48 to the output buffer 111. This in turn is sent through the transmit register 105.

A memory transfer command is a store or a fetch. On a store, the computer will transfer a block of data into the system memory at addresses specified in the header page. On a fetch, the computer will send a header page containing the addresses of the requested data pages, and system memory will send the requested pages back.

The CI effects this transfer of data to or from the system memory as follows: The fifth DW of the header page is requested from the input buffer 109 and stored in a register the BSM address register 53. This contains the first system memory page address and page count as specified in the system architecture. The page count in register 52 is based upon a subfield of the page address in register 53. The CI logic 113 requests a switch connection to the appropriate storage module (BSM). The BSM address is the two bits coupled through multiplexer 60 to the route code register 52. This is sent via port 113b. Once the connection is established, the CI will transmit the entire page address along with a command (store or fetch) to the BSM on the switch data bus at port 113a via multiplexer 49. Then, if the operation is a store, the CI will request the next page of data from input buffer 109, transmit it to the connected BSM along the switch data bus, and drop the connection. If the operation is a fetch, after sending the page address and command to the BSM, the CI waits for data from the connected memory to be sent back on the switch data bus, passes it into the output buffer, and drops the connection.

Data is transferred to and from the BSMs in pages. With each page address in the header page is a page count. This page count specifies the number of pages to be transferred to or from the system memory starting at the corresponding page address and progressing incrementally. Sequential addresses will not correspond to the same BSM. Thus it is necessary for the CI to establish a new switch connection for every data page to be transferred. After each page transfer, the CI increments the page address at register 52 and uses the new value to establish the switch connection of the next data page transfer. When the number of pages corresponding to the page count at counter 55 have been transferred, the CI requests the next system memory page address and page count in the header page from the input buffer. The number of page addresses that are contained in the header page is specified by the block count at counter 47.

Finally, the CI must communicate to the attached computer that an operation has occurred successfully or it has failed. This is accomplished by transmitting the header page back to the computer with the status information imbedded via multiplexer 48. On the store operation, when the entire data transfer is complete, the CI will send a request to the input buffer 109 to read out the entire header page. When the input buffer sends the page, the CI imbeds status information into the fourth DW as described in the system architecture, and routes all of the data into the output buffer. On a fetch operation, the CI will send the return header prior to sending any of the requested data pages. In this way, the attached processor will be able to identify whether the following data corresponds to the memory data it requested, or to an incoming (asynchronous) signal (see above).

Figure 11A:
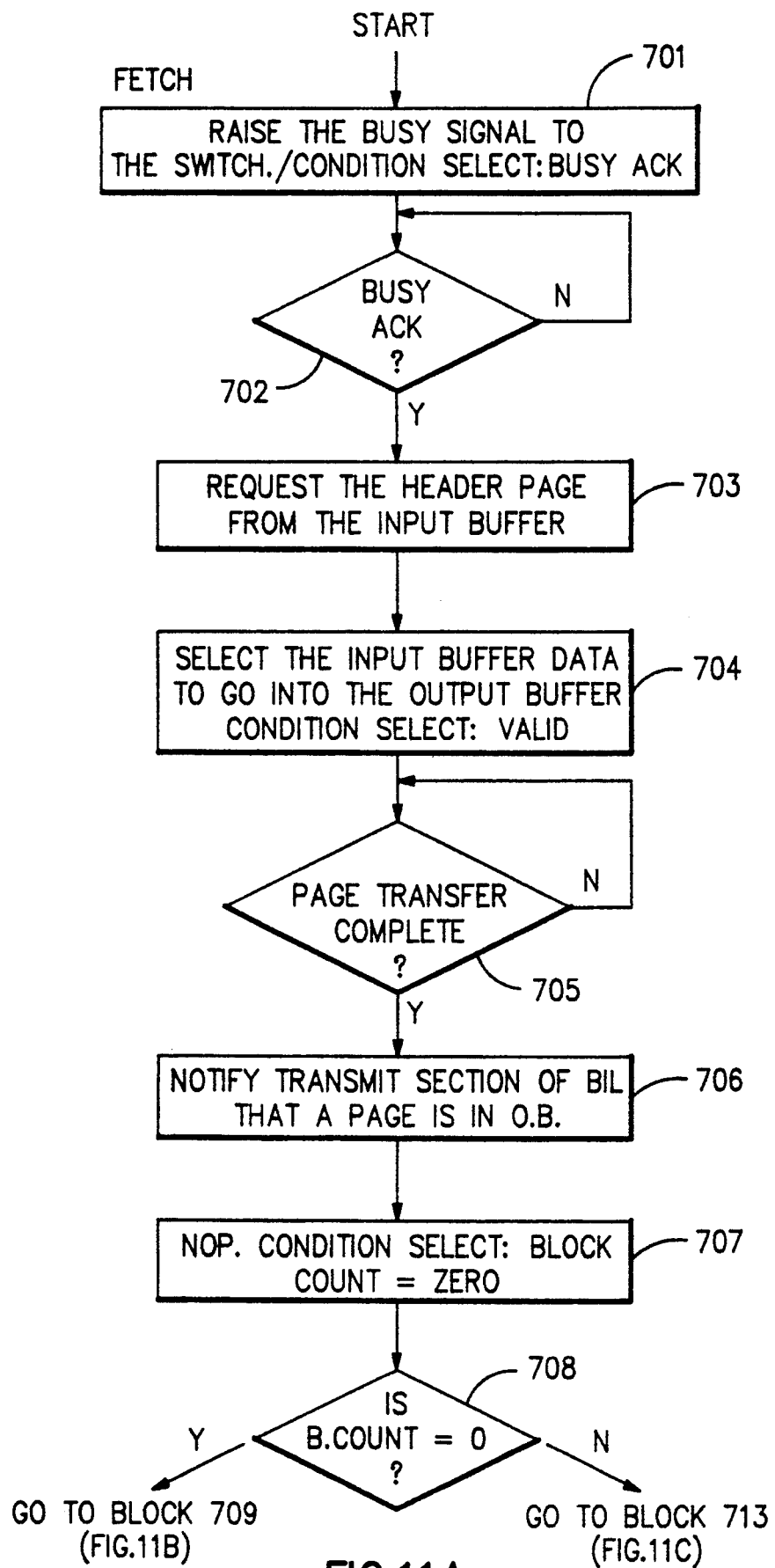
FIGS. 11A thru 11D are flow charts of the fetch command.
Figures 11B, 11C:
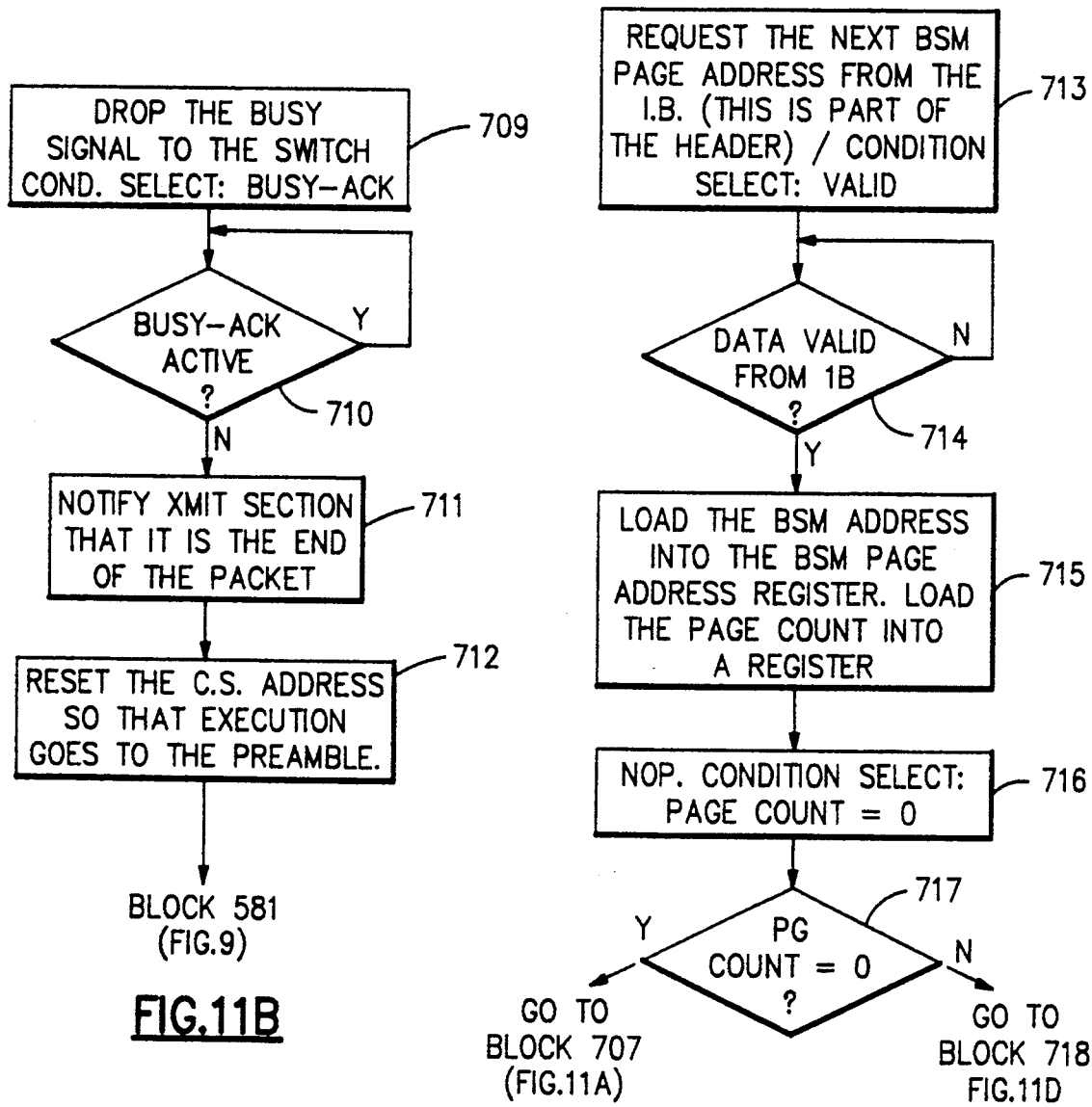
Figure 11D:
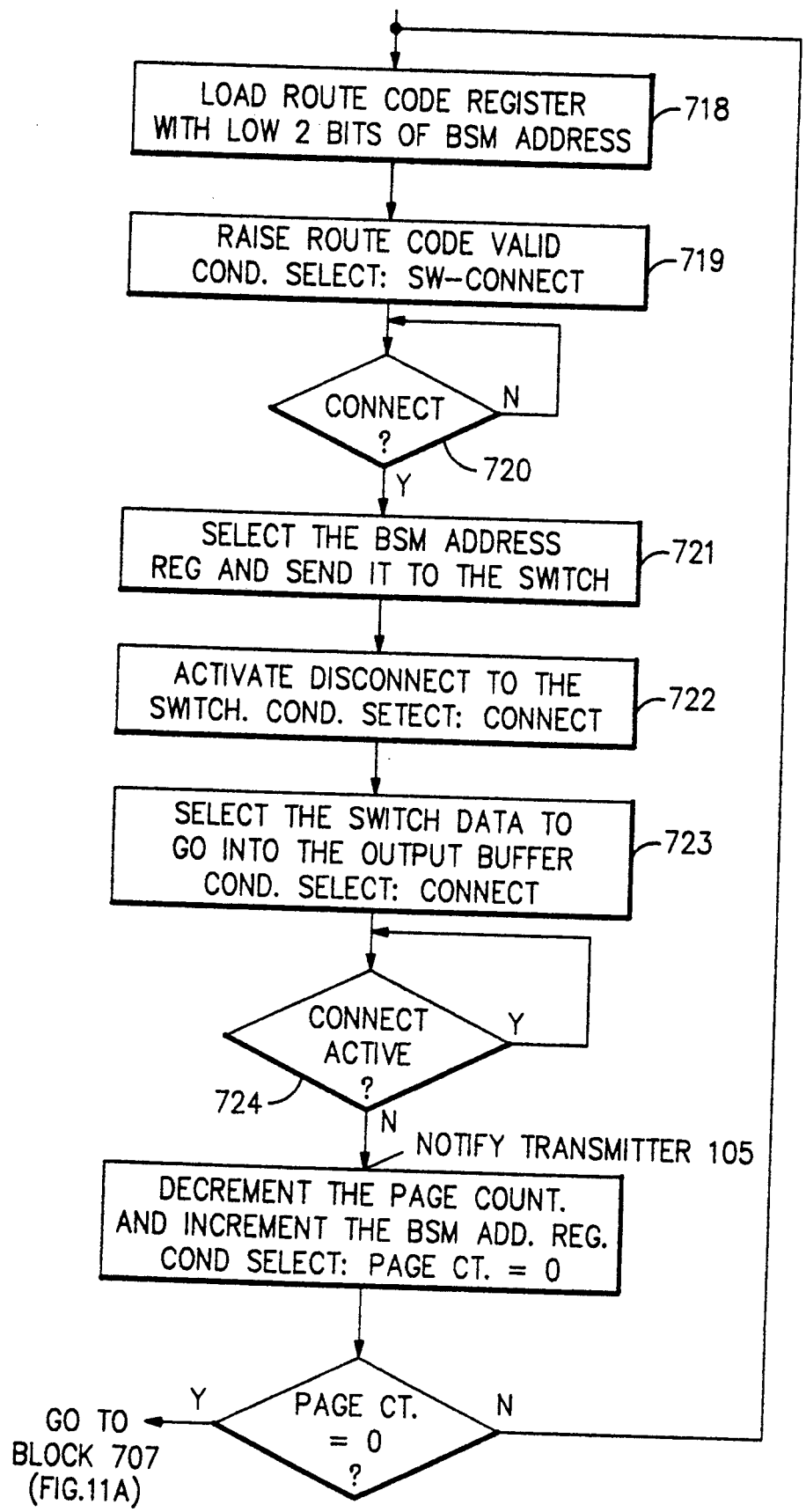

Referring to FIG. 11 there is a flow chart for the fetch operation instruction in the control store. The busy signal to the switch is raised. Once that is acknowledged and received at the condition point, the header page is requested from the input buffer. The input buffer header data is sent to the output buffer 111 via multiplexer 48 and the condition looked for at the control store is valid from the output buffer. When the page transfer is complete the transmit adapter section 105 (FIG. 5) is notified that the header is in the output buffer. The non operating (No-Op) condition is selected to set the block counter 47 to detect when the count is zero. If the count is not zero at decision block 708 request the next BSM page address from the input buffer. This is in part of the header. The control store condition select looks for valid. When there is a data valid from the input buffer the BSM address is loaded into the BSM page address register 53. The page count is also loaded into a register. The condition select is set to look for page count zero. If the page count is already zero (block 717) the system checks to see if the block counter is zero and if so the busy signal is dropped (block 709) to the switch and the system looks for the busy acknowledge condition in multiplexer 46. If the busy-acknowledge is not active the transmit section 105 is notified that it is the end of the packet and the control store address is reset to send the system back to the preample at block 501 ending the fetch command. If decision at decision block 717 is no that the page count is not zero then the system goes to block 718 and and the route code register 52 is loaded with the two bits of the BSM address via multiplexer 60. The route code valid is raised and sent from decoder 43. The condition select at multiplexer 46 looks for switch connect from the switch 25 which goes to the "CND" field. When there is received the connect, the BSM address is sent to the switch 25 via the data bus. The disconnect (BIL disconnect) to the switch is then sent. The return data from switch 25 is also selected to go to the output buffer via multiplexer 48. The system then looks for the connect to be inactive. When inactive the page count is decremented and the BSM address register is incremented, the transmit section 105 is notified that a page is in the output buffer 111. The condition select looks for page count of zero (decision block 726). If not zero loads the route code register with the route code and repeats. If the page count is zero goes to look at block count at block 707.

Figure 12A:
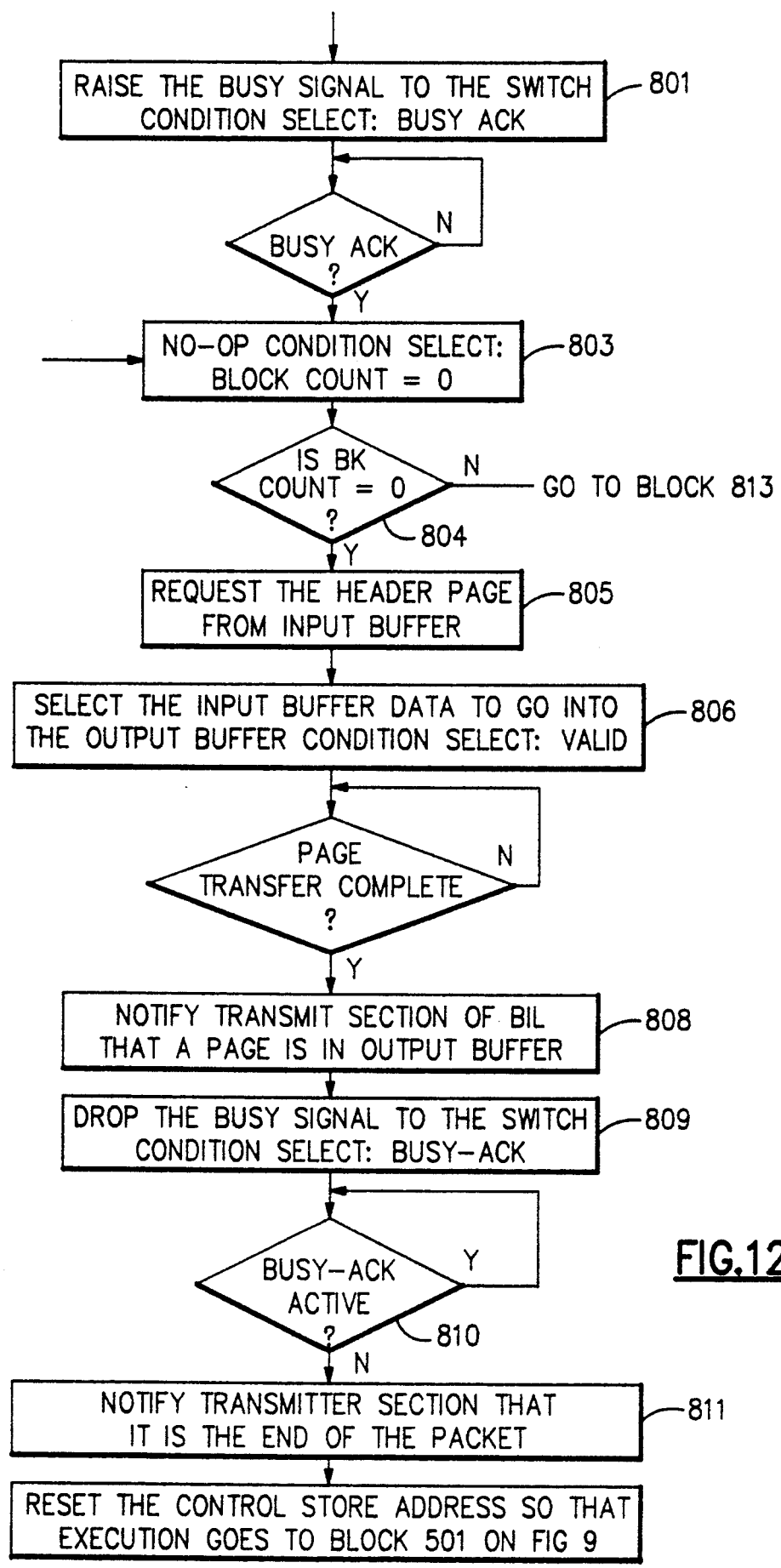
FIGS. 12A thru 12C are flow charts of the store command.
Figure 12B:
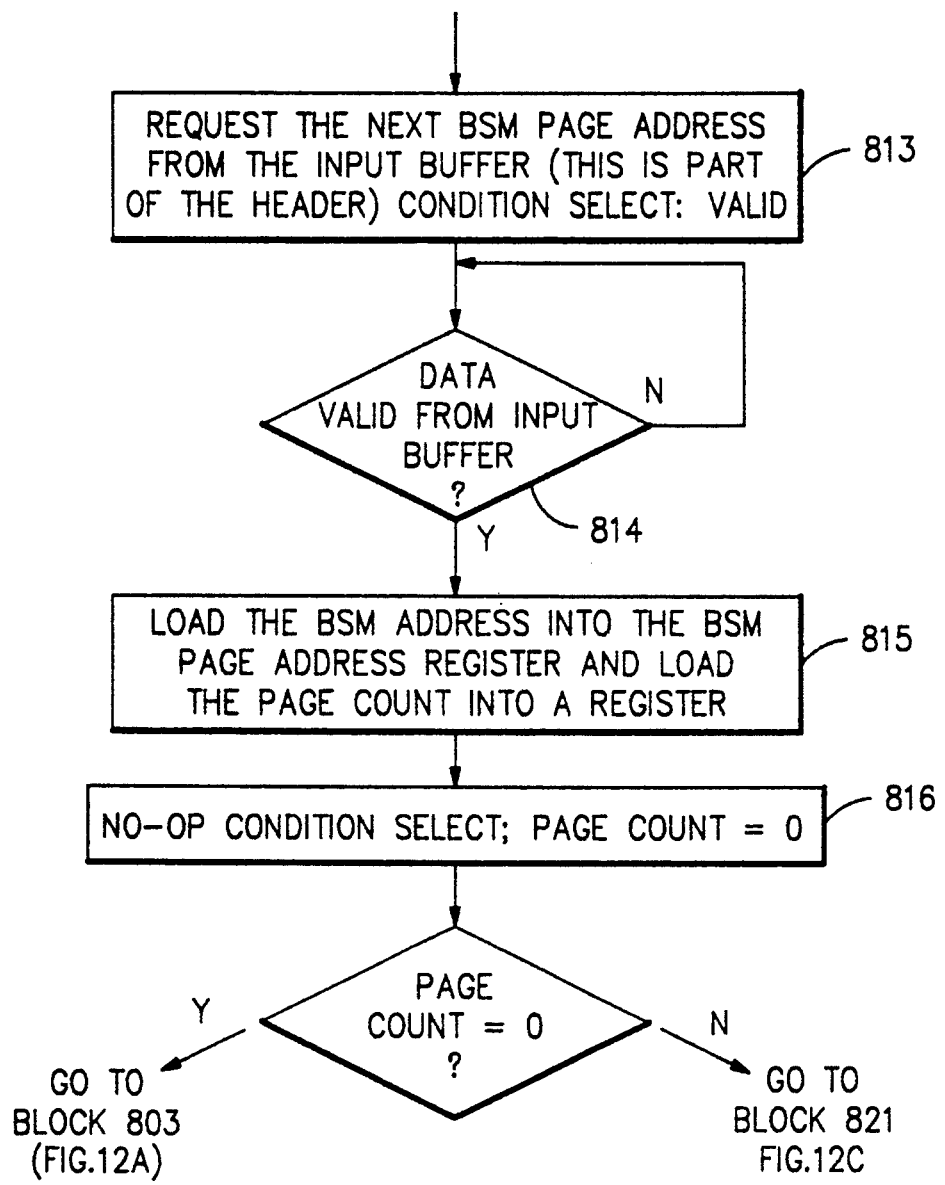
Figure 12C:
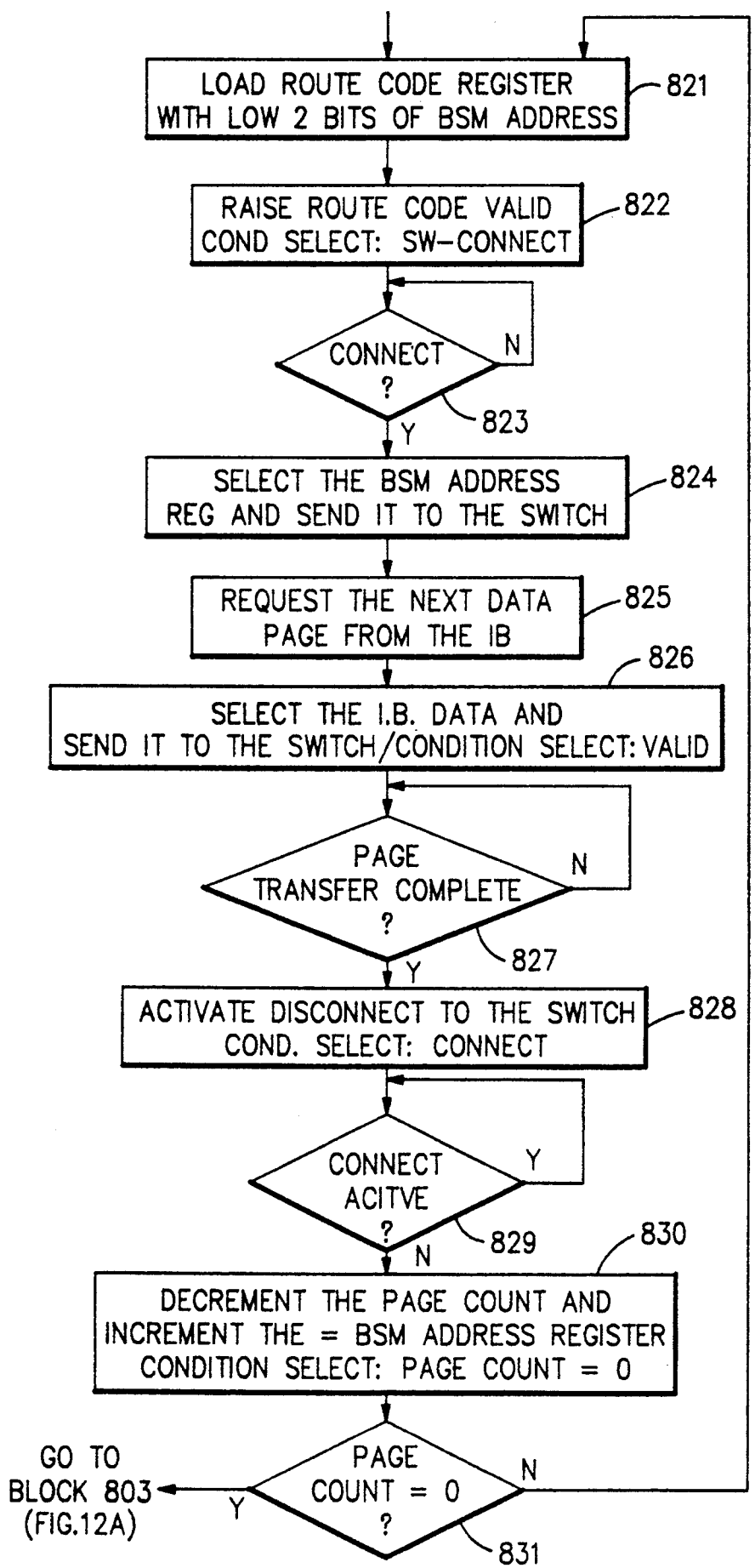

Referring to FIGS. 12A–12C there is the flow chart for the store operation. The busy signal is raised to the switch and when an acknowledge is received the block counter condition of looking for a zero is set. If not zero request the next BSM page address from input buffer (block 813). After a data valid is received the BSM address is loaded into the BSM address register 53 and the page count is loaded into counter 55. The system is set to look for a page count of zero. If the count is not zero the route code is loaded into register 52 and route code valid is sent and the system looks for the switch connect to be received from the switch. When the switch connect is received (at block 823) the BSM address at register 53 is sent to the switch via multiplexer 49. The next data page is then requested from the input buffer. The data is sent to the switch and the system waits for a valid to go inactive. When page transfer is complete a disconnect is sent to the switch and the system waits for the connect to go inactive from the switch. When it occurs the page count is decremented an the BSM address register is incremented. The system looks to see if the page count is zero. If not and there are more pages to store the operations repeat starting at block 821 until the page count reaches zero. When the page count is zero the system goes to block 803 and it determines if the block count is zero. If not the system goes to block 813 to request the next page. If the block count is zero the header page is sent to the output buffer. After this is completed the transmit section of the BIL is notified that a page is in the output buffer. The busy signal is dropped and the system looks for the inactive busy-acknowledge. The transmit section 105 is notified the end of the packet and the control store address is reset to receive a new command.

On a lock operation, the computer sends a lock request to the system lock array in the form of a lock address and a lock ID. The lock array will either grant or deny the lock, and the computer will be notified by a return header.

When the CI receives a lock command, it requests a connection through the system switch with the lock array. When the connection is granted, the CI requests the second and third DW of the header page which contain the lock address and ID and sends them to the lock array along the switch data bus. The lock array will respond with a lock pass, or lock fail and pass back, along the switch data bus, the ID currently held in the addressed lock array location. The switch connection is then dropped. The CI then sends a request to the input buffer to read out the entire header page.

Figure 13B:
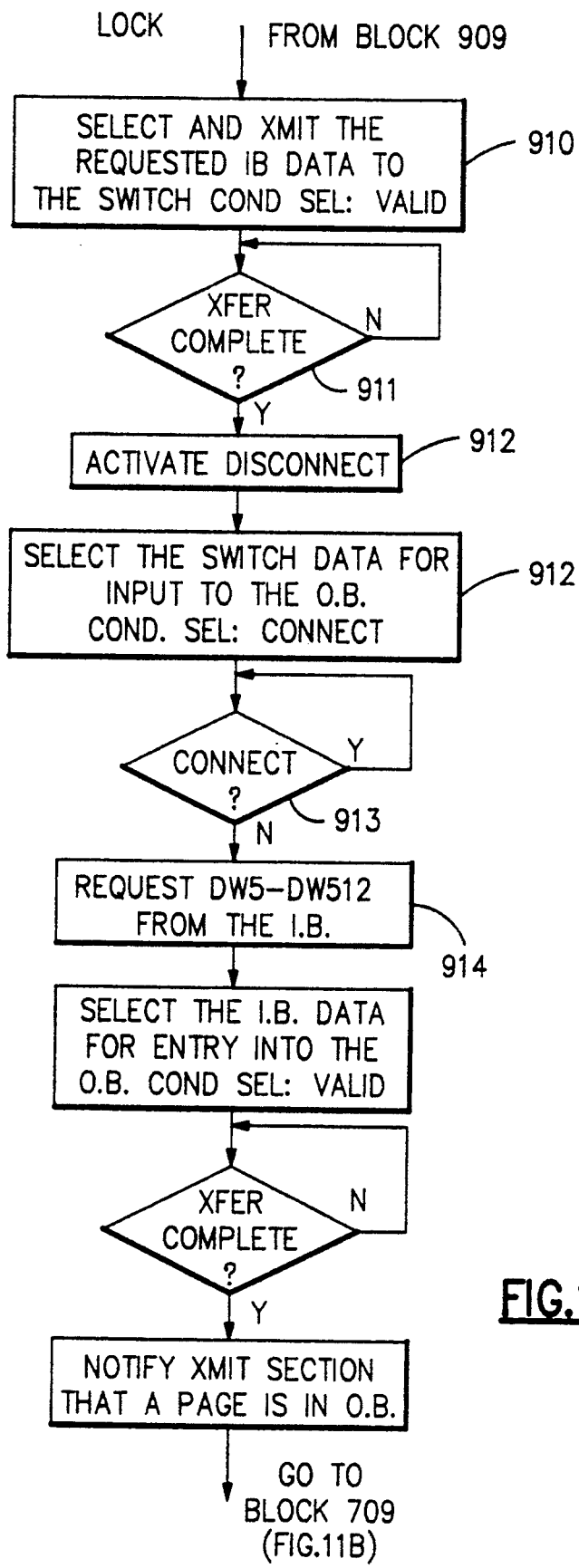

Referring to the lock flow chart of FIG. 13 the sequence calls for busy to be sent to the switch. After receiving the acknowledge the first three double words are requested and the input buffer data is sent via the multiplexer 48 into the output buffer. When complete the route code with the corresponding lock connection is loaded at register 52. The route code valid is sent to the switch and the system looks for the switch connect at the condition points. When the connect is received the second and third double words from the input buffer are loaded (Block 909). The requested input buffer data is sent to the switch. When complete the BIL disconnect is activated (Block 912). The interface switch is selected to provide data to the output buffer. The switch is responding to the lock request with a lock response which gets folded into the return header in the fourth double word. When the connect goes inactive the remaining double words are requested from the input buffer and the input buffer data is sent to the output buffer. When complete the transmit section 105 is notified that a page is in the output buffer 111. The busy signal to the switch is dropped and after the busy-acknowledge is received the transmit section 105 is notified the end of the packet and the control store is reset to look for a new command.

Figure 14:
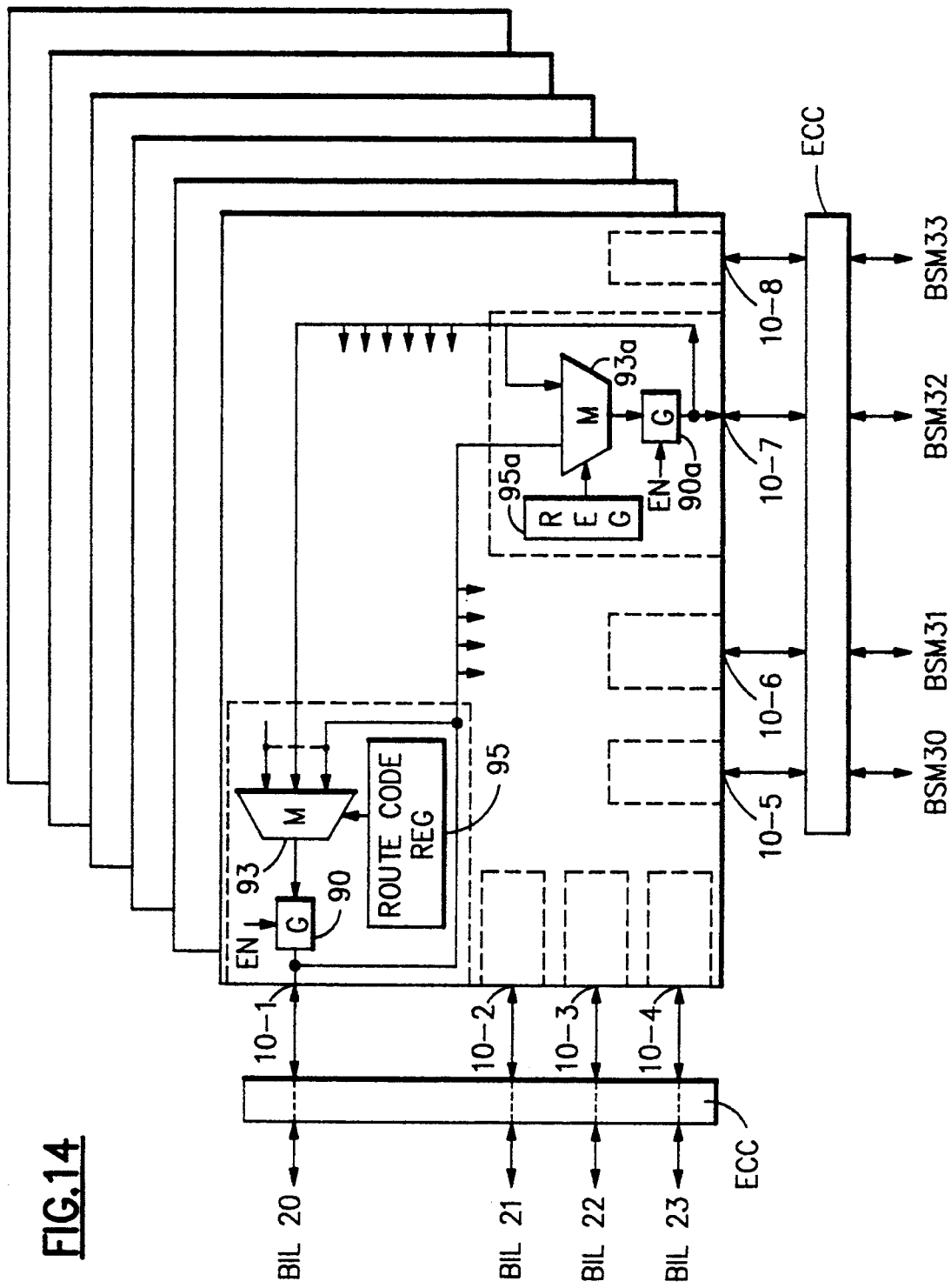
FIG. 14 illustrates a crossbar for the crossbar switch.

The switch has four BIL ports, four BSM ports, a lock/configuration port and the switch may be for example, a Texas Instrument crossbar switch No. SN74ACT8841 with bi-directional gates. The crossbar switch 25 includes six crossbar units for handling BSMs and BILs as represented in FIG. 14. The crossbar units each have sixteen (16) ports where each port passes 4 bits. The 39 bits plus valid and parity bits are distributed across the six crossbar units handling 48 bits with a pair of crossbar unit ports coupled to a BIL and a BSM and controlling 8-bits. For ease of the drawing only one port connection for each of the BILs and BSMs is shown. This connection passes 4 bits. The 4-bit ports of switch input ports 10-1 thru 10-4 are coupled to BILs 20 thru 23. The ports 10-5 thru 10-8 are coupled to BSMs 30 thru 33.

Figure 15:
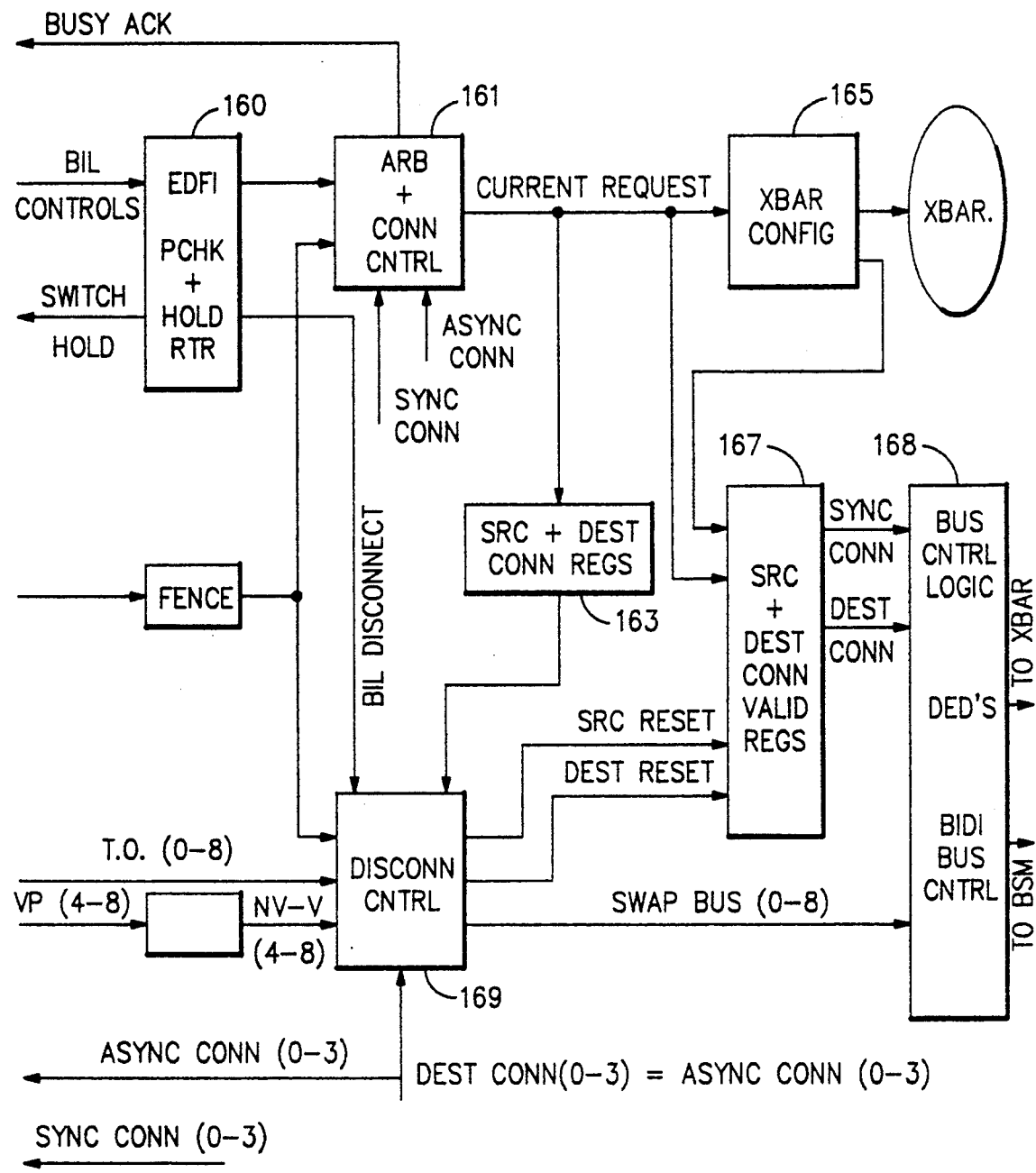
FIG. 15 is a diagram of the switch interface and control logic.

At each port there is a directional gate 90, a multiplexer 93 and a register 95 and the circuitry shown. The multiplexer 93 receives the inputs from all the other ports 10-1 thru 10-8. The multiplexer passes only the data from source identified in the register 95 and that source is enabled at gate 90 by an enabling signal. These ports will always receive (bypass gate 90 on input) but will not transmit out of port unless the gate is enabled and the register 95 contains the proper ID or route code for that port. Therefore the output of the switch end must have a control signal applied to the gate to enable it as well as the appropriate register ID or route code to complete the circuit from one port to another. FIG. 14 shows a connection between BIL 20 at port 10-1 and BSM32 at port 10-7. For the lock switching there are four BIL ports and a lock port. There are two crossbar units for the lock switch. Each crossbar uses three of its ports to each of the five (4-bits and lock) and therefore handles 12 bits. The second crossbar handles the second 12 bits. The control for the crossbar discussed above is provided by the control switch interface and control logic shown in FIG. 15. The control signals from the command interpreter are the route code 4-bit code ID for determining port (4BILs,4BSMs or lock table), route code valid, BIL hold, and BIL disconnect. These control signals are applied to the EDFI Parity Check and Hold 160 and when the parity check is made the valid signal sent back to the command interpreter 113 enables the signals to be applied to the arbitrator and connection control 161. The arbitration is round robin for the attached BILs. The arbitrator sequences from BIL to BIL and when it encounters a signal it stops at that BIL and it is checked to see if the source can be connected to a destination and if so it is connected. If lensed it means where there is no BIL at that port. The fence signal is sent from control 107. There are two types of connections, synchronized and asychronized connections. The requesting BIL is connected in a synchronized fashion since it requested the connection. Destinations are connected asynchronized when the destination did not request the connection. Each request is for two way connection to another BIL or to one of four BSM interleaves or to the lock/configuration table. Based on the BIL-switch handshaking, the route code is recognized as valid to start an arbitration. The route code contains the destination address. The source BIL ID is identified by the arbitration sequence and the source ID is stored in the appropriate source connection register of registers 163. The destination register stores the destination ID in the appropriately identified destination register. In the connection control 161 it is determined if the destination is connected and if so if it is connected as a source or destination or if it fensed. If the BIL is a destination it is determined if it is on hold or busy. These signals are provided by each BIL (Command Interpreter). The async connection input to logic 161 indicates the destination of another BIL and the sync connect input indicates a source of any request. The switch will grant the connection based on the availability for that destination and the round robin priority. The crossbar configuration 165 takes the source from the arbitration and connection control and the destination from the route code signal to provide a signal for setting the registers 95 in the crossbar unit (see FIG. 12). The source and destination registers 167 for each source and destination identify if the connection still exists and the valid. If so that register provides an enable through logic 168 to the gates 90 in the crossbar to allow output. For a BIL to BIL type operation for signaling there is no return data. The BIL disconnect command at the end of the data is applied to control 169. The disconnect control looks at registers 163 and if a BIL destination or a BIL source sends destination reset or source reset causing deactivation of destination BIL (async) and source BIL (sync). The BIL (async) does not return an acknowledgement after the last double word is transmitted to the switch. The switch will drop the connection via handshaking with both the source and destination BILs. The switch takes 5 cycles to drop a signaling connection in a normal disconnect operation. The disconnect controller determines when to terminate connections, establishes the direction of data flow through the crossbar switch by providing a swap signal to the crossbar controller and provides the sync connect and async connect handshaking with the BIL. When after the BIL disconnect is received and it is determined that the destination from the destination registers is for BIL to BSM or lock, the bus is turned around. The source becomes the destination and the destination the source. After the last double word is transmitted from the BIL to the switch and the switch to the BSM the switch will begin a time out sequence until the BSM responds. If no response is received by the switch within the turn-around time of 64 cycles the connection is terminated. Time outs are only for error conditions. If a response is received the switch terminates the connection after the last cycle of data of the BSM has been transmitted. One of the destination registers of registers 163 and 167 indicates the connection to the lock array. The command and data for the tables is via the data bus. The control to access the table if arbitrated and handled as a store or fetch control to a BSM with a swap bus as with a BSM destination after a BIL disconnect.

Figure 16:
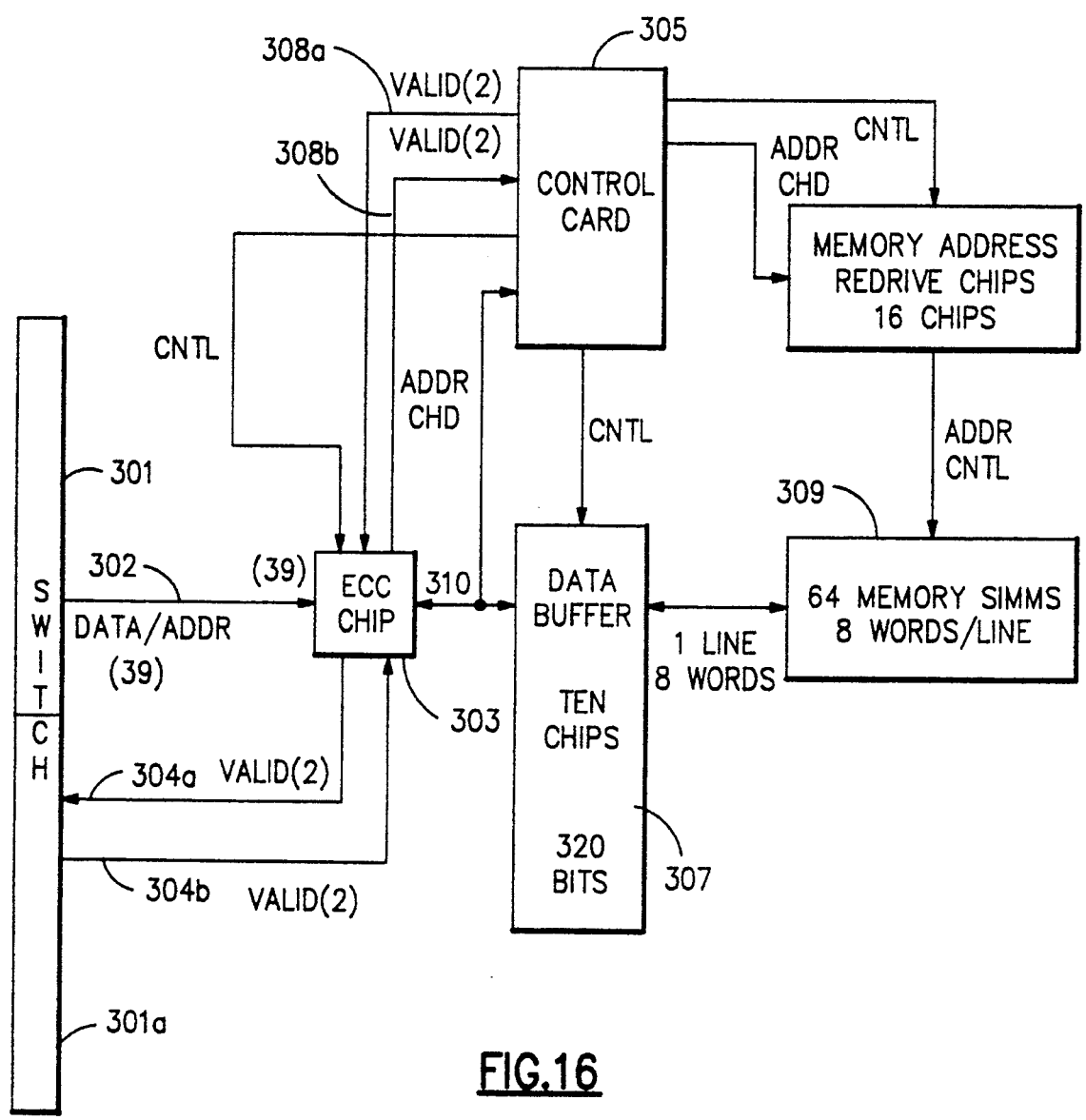
FIG. 16 is the memory (a BSM) functional block diagram.

The shared common memory comprises four basic storage modules (BSM's) each basic storage modules (BSM's) (30-33 in FIG. 2. Each BSM includes a pair of memory planar boards (30a, 30b; 31a, 31b; 32a, 32b and 33a, 33b) a control card and an integrity card. Referring to FIG. 16 the data from the switch enter via a 39 bit switch 301 plus a switch coupling two valid bits into the board and 2 bits out of the board. The switch 301 is bi-directionally coupled to the ECC logic 303 for parity control on the valid bits. The two valid bits from switch 302 are coupled to the EC logic and the parity/valid bits are sent back to the source returns via switch 301a. The command and address information from the ECC logic 303 is applied to the control card 305. Also if there is an error signal in the ECC logic that is also applied to the control card 305. The data input from the ECC logic 303 of 39 bits is applied to buffer data latches 307 which are 39 bit bi-directional latches which store eight 39-bit words. In storing after each group of seven cycles or data words into the buffer 307 half of the data or four words is applied to the 64 DRAMs 309. The DRAMs are packaged on SIMMS (single in-line memory modules). A SIMM is a 20 chip double sided card. These 64 SIMMS are divided into 8 groups of SIMMS each. A group of SIMMS represents two. Each SIMM has memory chips on both sides. These chip are 16 banks total per board.

Transfers to and from memory are on page or 4K bytes boundaries. Each Memory Planar Board manipulates ½ page or 2K bytes of data. Data is written into and read out of memory on a page basis. A line consists of 8 words. Each word (32+7 ECC) contains only one bit from each of ten chips per 4 SIMMS (40 bits). Therefore, if a single chip fail occurs, only one bit from the failing chip will be contained in the word and the error can be corrected.

When a transfer is initiated, 512 consecutive words are transferred between each of the switches 301 and 302 and Memory Planar Boards. On a write operation, this data is buffered until seven words are received and then four words are transferred to the memory at one time. On a read operation, eight words are read from memory (DRAMs 309) and buffered at buffer 307. This data is then transferred to the Switch 25 via switch 301 a word at a time. This translates to 64 memory transfers since each memory transfer consists of 8 words which are either read from or stored into two alternating memory banks. These two memory banks that operate together are referred to as a group. There are eight such groups on the MPB as follows: 1A&B, 2A&B, 3A&B, 4A&B, 5A&b, 6A&B, 7A&B and 8A&B.

The Memory system (BSMs 30–33) is designed to perform page transfers, and there are only two valid commands, a page read and a page write. Depending on the memory configuration, a BSM can contain from 8K to 1M pages. A page is equivalent to 4K bytes of data and pages are interleaved among the four BSMs.

The Control Card (305) plugs into the memory planar board (MPB). The Control Card 305 controls the operation of the entire MPB by properly sequencing various memory tasks. These tasks include: data flow control, memory reads and writes, memory refreshes, and address reconfigurations. For data flow control, the Control Card decodes an incoming command and latches it with the accompanying address. The MPB operates on only two commands, a page read and a page write. A NO-OP (no operations) command is recognized, but doesn't cause any action other than transmitting a BSM "not valid" to the Switch 25. A page read/write operation involves 512 word transfers to/from the Switch 25. On a read command, information is passed from the BSM to the Switch. The Control Card's data flow control is responsible for sending a BSM signal to the Switch 25. This signal is used by the ECC logic to turn the information bus around, into a sending state to drive the Switch.

Figure 17:
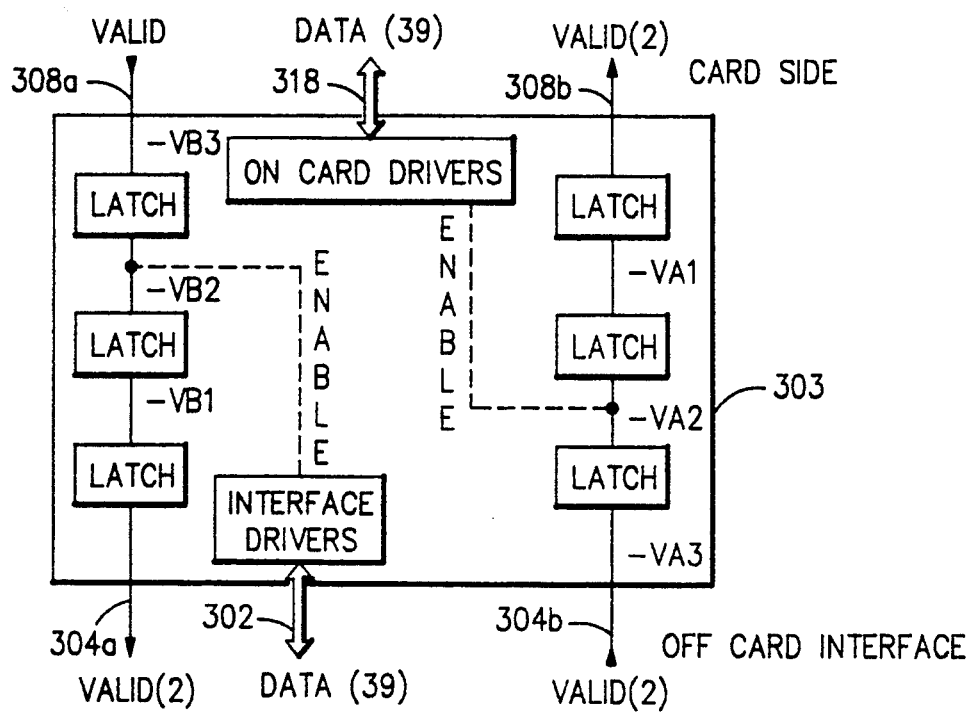
FIG. 17 illustrates ECC logic between BIL and switch, switch and crossbar and switch-BSM and lock.

This signal (Valid) is used by the ECC logic to turn the information bus around, into a sending state to drive the Switch 25. The ECC logic actually contains two functions. The first is the data integrity function or parity and ECC generation and checking. The second is the bus direction control. The entire system data flow is centered around bi-directional busses. The BIL -Switch data bus, Switch crossbar switch busses, and Switch-BSM/Lock busses are all bi-directional and have ECC logic as shown in FIG. 17. With bi-directional busses it is important to control the direction of data flow through the system to avoid data conflicts and circuitry damage due to drivers on both sides of the bus trying to send data. The solution to this problem is often a bus arbitration mechanism that can have critical timing requirements when efficient use of the bus is required. (If many dead cycles can be tolerated between data flowing in one direction and data flowing back in the other direction then the timing requirement is reduced). In the described system the ECC chip 303 uses the valid Signals 304 and 308 that accompany the data 302 to both indicate that the data is currently useful (valid) and control the direction of flow through the ECC chip 303. The double use of the signal both reduces the number of signals required to control the system but also allows the ECC chips to provide distributed (local) direction control of the system data flow. The ECC chips receive Valid signals from the sources on either side 304 and 305. When a Valid signal 304 indicates the data on 302 is Valid the ECC chip latches up the data on that side of the chip as input. It also turns on the data drivers on the other side of the chip 310 to minimize the delay in outputting the data. The data takes 2 additional cycles to pass through the chip so when the drivers originally turn on the Valid signal that accompanies the data indicates that it is not Valid. Data is passed through the chip with it's accompanying Valid signal until no more Valids are received at the input. When the last Valid has exited the chip with it's accompanying data the drivers are turned off. In this state both busses are inactive. When the next Valid appears at either input side the operation is repeated. There is no separate bus control signal, the Valids serving double duty as bus direction control and data valid indicators. This allows the ECC chip to turn on it's drivers early without worrying about circuit damage since it can detect Valids on both sides and disable all drivers in case of a bus conflict. It also allows the system to turn around the bus in a single cycle with no dead cycles required. The ECC chip at the end of the line (either BSM or BIL) can accept data the cycle after it sends it's final Valid out. The logic driving it would have to count Valids to do this but if an error occurred in the counting the ECC chip would prevent damage by sending the error and turning off it's drivers. In the current system the logic senses a Valid to Not Valid transition to indicate the end of a transfer. This inserts one dead cycle in the data flow but allows for arbitrary lengths of data transfer without a prior knowledge of the receiving system.

After the bus direction is changed, the first, of 8 words (also first line of 64 lines) is read out of the memory and latched into the data buffer 307 on the MPB. This memory read takes two cycles as explained below. After each line is read and stored the Control Card selects one word at a time from the Data chips and sends it to the Switch 25. Once all eight words have been sent to the Switch 25, the next line is read form the memory. This is repeated until 64 lines have been read from the memory and all 512 consecutive words have been sent to the Switch 25.

The control of data for a write is done in reverse. After decoding the write, eight words are stored into the data buffer 307. Then the entire line is written into the memory. Writing to memory, like reading from memory takes two cycles. On the first cycle words 1-4 are written into memory then the next cycle words 5-8 are written into memory. After all 512 words have been written into the memory (64 lines), the Control Card sends the Switch a BSM valid signal. This BSM valid signal is sent only if the entire write operation occurred without any errors. If an error occurred, the MPB does not send anything to the Switch, causing it to time out. The entire write will take place regardless of error, potentially causing "bad" data to be written into the memory.

The memory read and write portions of the Control Card 305 controls the address and control lines for the memory modules. An example of one plan of record design uses 2M×40 bit SIMS. These SIMMS are laid out with 8 word rows as specified in the memory Planar Board portion of this document. A MPB has 512 MB of storage.

To access a location in memory (1 line, 8 words), the Control Card activates the Row Address Strobe (RAS) for that line (8 words). Then the Control Card puts the 10-bit column address on the bus. This address remains valid for 3 cycles. On the second of these three cycles the Column Address Strobe (CAS) for the first four words is activated. On the third cycle, CAS for the last four words is activated. This sequencing of data, four words at a time, is for data latching synchronization of the eighth and first word in the line.

For example, when the eighth word has to be latched into the ECC logic 303 from the data buffer 307. Simultaneously, the new data is also being read from the memory. This ensures that the first word of the next line can be put into the ECC logic on the next cycle and that the data rate to the Switch 25 is maintained. If the entire line was read at once, then the eighth word from the previous line would be overwritten in the ECC logic by the new line's 8th word. This would occur since both latch enable and output enable are active (transparent mode of operation). The memory operates in this way on both read and write commands, activating the first four word then the second four words of the line on the next cycle.

A MPB populated with SIMMS requires 20 address bits to specify one of 1 million addresses. Fifteen of these bits come from the original address which is latched with the command at the beginning of the cycle. These 15 bits specify 1 of 256K pages. The remaining five bits required to specify the address within the page are generated by the Control Card. This gives the Control Card 64 unique memory locations to read and 64 lines (one 2K page/MPB) from. Thirty-two of these 64 lines come from the A side of the SIMM and the other thirty-two come from the B side of the SIMM as follows:

| 15-bit page | 5-bit w/in page | side |
| --- | --- | --- |
| XXX | 00000 | A |
| XXX | 00000 | B |
| XXX | 00001 | A |
| XXX | 00001 | B |

The Control Card also controls the memory refresh function. The entire memory is refreshed every 8 millisecond (ms). The Control Card, however, can be programmed to refresh the memory at any time between 4 and 8 ms. The refresh rate is set with configuration DIP switch on the Control Card. The refresh is interleaved such that the B side is being refreshed when the A side is accessed; and visa versa. By performing the refresh operation in this way memory transfers are not affected.

The MPB can be configured with 512K×40 bit, 2M×40 bit, or 8M×40 bit SIMMs, yielding 128 MB, 512 MB, or 2 GB, Memory Planar Boards respectively. In addition, the MPB population density is also configurable. You can have MPBs fully populated, half, quarter, or one-eight populated with SIMM cards. The configuration DIP switches for these configurations are also located on the Control Card.

The memory address must be reconfigured to correspond with the memory technology and the amount of memory on the MPB. The memory address bits are decoded according to the memory configuration DIPs. Address out of range tests are performed on the address, as it comes from the switch, and before it is driven to the SIMMs.

Figure 18:
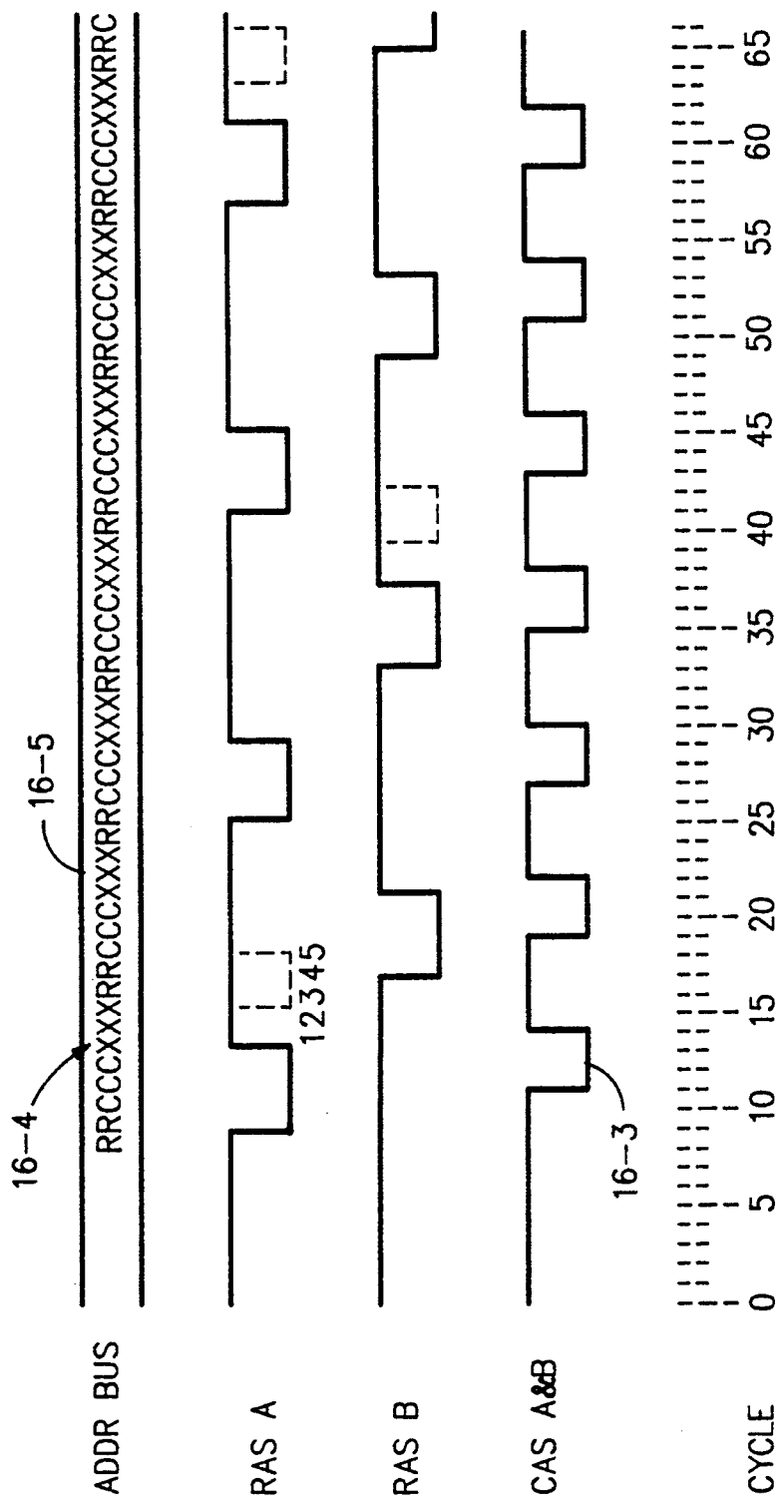
FIG. 18 illustrates hidden refresh timing.

The BSM implements an interleaved refresh operation as illustrated in FIG. 18. Since the page reads and writes oscillate between the A and B sides of the memory, the A side can be refreshed (16-2), while the B side is being accesses (16-3). This "hides" the refresh since it is done in between line transfers. In this way the system is not forced to wait for refreshes to be completed, which would cause gaps in the page transfer. See FIG. 18 which illustrates how the refresh is interleaved.

The refresh rate for this system is every 48 cycles, but the design can accommodate doubling this refresh frequency to every 24 cycles. This would be required if the refresh rate needed to be every 4 ms. Refreshing will be performed the same way whether the rate is 24 or 48 cycles as shown below:

| Refresh period | Line Divisions | |
| --- | --- | --- |
| 24 or 48 | 1A, 2A, 3A, 4A<br>1B, 2B, 3B, 4B<br>5A, 6A, 7A, 8A<br>5B, 6B, 7B, 8B | (4 lines are<br>refreshed each<br>refresh period) |

This refreshing sequence will remain constant even if the memory is not fully populated. In other words, every line of data will be refreshed even if only half of them are physically on the memory board.

The entire refresh cycle will take cycles (40 ns/cycle) to complete as follows: The refresh control logic will latch a refresh request from the refresh counter. If refresh is pending when a refresh cycle is allowed the refresh can be performed. The Control Card will send the Refresh address onto the bus 16-4 whether the refresh is allowed 16-4 or not 16-5. The address will be valid for two cycles before the CAS refresh cycles begins since the cycle starts with the deactivation of the CAS line 16-3. For Cycles 3-5 four RAS lines (one of the groups above) are set Valid for three cycles. This causes all of the chips in the four lines with that row address (all column addresses) to be refreshed. For Cycles 6-7 this is the RAS precharge time 16-2.

A refresh will occur anytime the memory is not busy or when the CAS lines goes HIGH/inactive when a memory transfer to B is taking place. A refresh cannot be granted immediately following a write cycle. The reason for this is that the Switch sends the data a word at a time, and the BSM latches each word until eight words are received. The BSM then write all eight words into the memory. The Switch sets Switch valid inactive right after the last valid word of data is on the bus. This data goes into the ECC logic (2 cycles) and then it goes into the data buffer 307 (1 cycle) before it is actually written into the memory (1 cycle).

Once this data is written into the memory, there is a CAS precharge to RAS active time of 10 ns (1 cycle) that has to be met before the next memory access can occur. Because of this, the MPB will be considered busy for five cycles after any memory write cycle. Since the write request presents the worst case condition, a refresh will be started five cycles after either a read or write operation.

Although it is not a concern for refreshing, because there is approximately an eight cycle latency through the Switch, this five cycle rule is also applicable on back to back cycles requested from memory. On back-to-back cycles there must be at least five cycles of delay from the time the switch valid is active for the eighth word to the time when the next command can be sent to the memory.

What is claimed is:

1. A supercomputer system comprising:
a plurality of computers each having a computer direct memory access link adapter means for sending and receiving data in packets in accordance with a communications protocol for the supercomputer system with each packet starting with a header page containing identifying command and destination information for the packet;
a combiner/memory system including internal shared memory means and a plurality of ports each port with a separate port direct line adapter means that is responsive to said header pages to send and receive the data in packets at said ports;
a separate direct memory access link connecting each one of said computer direct access link adapter means to a different one of said port direct line adapter means to couple each of said computers to one of said ports so that data sent in packets between the combiner/memory system and each computer is through a separate link; and
switch means in the combiner/memory system connected between the plurality of port direct line adapter means and the internal shared memory means, said switch means including means responsive to any one of the port direct line adapter means for selectively linking said any one of the port direct line adapter means to another or to the internal shared memory means to form a path to send packets from one computer to another computer in said plurality of computers or from said one computer to said internal shared memory means in response to the command and destination information in the header pages of such packets.

2. The supercomputer system of claim 1 wherein said direct memory access link is a High Performance Parallel Interface or HIPPI link.

3. The supercomputer system of claim 1 wherein said internal shared memory means includes a plurality of memory modules and said switch means includes means for distributing data stored over said plurality of memory modules beginning at a start address indicated on the header page to permit interleaved access to said distributed data stored over said plurality of memory modules of said internal shared memory means.

4. The supercomputer system of claim 3 wherein said switch means includes a round robin arbitration means to access the port direct line adapter means in sequence and said switch means further includes means for storing a status of connections between the switch means and the memory modules and port direct line adapter means for coupling only when said memory modules and computers are not busy.

5. The supercomputer system claim 3 where each said port direct link adapter means includes a command interpreter including a control store responsive to a command address from said header page, a condition address from condition points of said system and a state address from the condition control points selected by said control store and wherein said control points are decoded from data out of said control store.

6. The supercomputer system of claim 1 wherein each said direct line adapter means includes an input buffer which can store the header and data pages pertaining to different packets and can allow new data to be written into said buffer while old data is read out.

7. The supercomputer system of claim 6 wherein said switch means includes a linked list which has a list of pointers that contains an entry for each page stored in said input buffer indicating an address of a next page in a header/page sequence.

8. The supercomputer system of claim 1 including locking means in said combiner memory responsive to a lock command from one of said computers for locking allocation to a block of data in said internal shared memory.

9. The supercomputer system of claim 8 wherein said locking means includes a locking table storing a lock identification at a location in the lock table and wherein if the location is available it said location is locked with an identification and if not the requesting computer is notified the lock failed.

10. A combiner/memory system for use in a supercomputer system with a plurality of computers to enable the computers to communicate with each other through the combiner/memory system using a communications protocol each computer having a computer direct memory access link adapter means for sending and receiving signals in packets in accordance with the communications protocol where each packet starts with a header page identifying command and destination information, said combiner/memory system comprising:

- internal shared memory means having a plurality of ports each with a port direct line adapter means responsive to the header page in each packet to send and receive data in packets at said ports in accordance with the communications protocol;
- a separate direct memory access link coupled between the direct memory access link adapter means for each one of said computers and a different one of said port direct line adapter means in the combiner/memory system; and
- switch means connected between said internal shared memory means and the direct line adapter means in each of the plurality of ports so as to be responsive to each direct line adapter means for selectively linking that direct line adapter means to another direct line adapter means or to the internal shared memory means to form paths for sending said packets from one to another computer in said supercomputer system or to said internal shared memory as directed by said command and destination information contained in the particular packet.

11. The combiner/memory system of claim 10 wherein said direct memory access link is a HIPPI High Performance Parallel Interface or link.

12. The combiner/memory system of claim 10 wherein said internal memory means includes a plurality of memory modules and said switch means includes means for distributing data stored over said plurality of memory modules beginning at a start address indicated on the header page to permit interleaved access to said distributed data stored over said plurality of memory modules of said shared memory means.

13. The combiner/memory system of claim 10 including locking means responsive to a lock command from one of said computers for locking allocation to a block of data in said internal shared memory.

14. The combiner/memory system of claim 13 wherein said locking means includes a locking table storing a lock identification at a location in the lock table and wherein if the location is available said location is locked with an indentificaion and if not the requesting computer is notified the lock failed.

15. The combiner/memory system of claim 10 wherein said direct line adapter means includes an input buffer which can store the header and data pages pertaining to different packets and can allow new data to be written into said buffer while old data is read out.

16. The combiner/memory system of claim 15 wherein each said direct line adapter means includes a linked list which has a list of pointers that contains an entry for each page stored in said input buffer indicating an address of the next page in the header/page sequence for a packet.

17. The combiner/memory system of claim 10 wherein said switch means includes a round robin arbitration means to access the port direct line adapter means in sequence and said switch further include means for storing a status of connections between said switch means and the memory modules, and port direct line adapter means for coupling only when said memory modules and computers are not busy.

18. The combiner/memory system of claim 17 wherein each said direct line adapter means includes a command interpreter including a control store responsive to a command address from a header page for a packet, a condition address from said condition points and a state address from the condition control points and wherein said control points are decoded from said data out of said control store.

19. The combiner/memory system of claim 18 wherein the data being decoded out of the control store for system control points is used in it's entirety as part of the next address to the control store.

* * * * *